(12) United States Patent
Brock et al.

(10) Patent No.: US 10,735,381 B2
(45) Date of Patent: *Aug. 4, 2020

(54) CUSTOMIZED HANDLING OF COPIED CONTENT BASED ON OWNER-SPECIFIED SIMILARITY THRESHOLDS

(71) Applicant: Attributor Corporation, San Mateo, CA (US)

(72) Inventors: James L Brock, Santa Cruz, CA (US); James E Pitkow, San Francisco, CA (US)

(73) Assignee: Attributor Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,045

(22) Filed: May 11, 2017

(65) Prior Publication Data

US 2017/0316802 A1 Nov. 2, 2017

Related U.S. Application Data

(63) Continuation of application No. 14/258,633, filed on Apr. 22, 2014, now Pat. No. 9,654,447, which is a
(Continued)

(51) Int. Cl.
*H04L 29/06* (2006.01)
*G06F 21/10* (2013.01)
(Continued)

(52) U.S. Cl.
CPC .......... *H04L 63/0263* (2013.01); *G06F 21/10* (2013.01); *H04N 21/2541* (2013.01);
(Continued)

(58) Field of Classification Search
CPC .............. G11B 20/00173; G06F 21/10; G06F 2221/0737; H04L 63/0263;
(Continued)

(56) References Cited

U.S. PATENT DOCUMENTS 5,629,980 A 5/1997 Stefik
5,634,012 A 5/1997 Stefik et al.
(Continued)

FOREIGN PATENT DOCUMENTS

WO WO2008058093 5/2008

OTHER PUBLICATIONS

Prosecution excerpts of U.S. Appl. No. 14/288,124 (now U.S. Pat. No. 9,342,670), including applicant submissions dated May 27, 2014 and Sep. 11, 2015, and Office communications dated Jun. 11, 2015 and Jan. 20, 2016.
(Continued)

*Primary Examiner* — Eleni A Shiferaw
*Assistant Examiner* — Sakinah White Taylor
(74) *Attorney, Agent, or Firm* — Attributor Corporation

(57) ABSTRACT

Making a determination of originality of content is disclosed. At least one originality factor related to the content is analyzed, wherein the originality factor is independent of a time when the content is detected. Based on the analysis of the at least one originality factor, automatically the determination is automatically made. The determination is outputted.

16 Claims, 20 Drawing Sheets

Related U.S. Application Data continuation of application No. 11/655,748, filed on Jan. 19, 2007, now Pat. No. 8,707,459, and a continuation-in-part of application No. 11/512,067, filed on Aug. 29, 2006, now Pat. No. 8,738,749.

(51) Int. Cl.
*H04N 21/254* (2011.01)
*H04N 21/2743* (2011.01)
*H04N 21/4627* (2011.01)
*H04N 21/8358* (2011.01)
*G11B 20/00* (2006.01)

(52) U.S. Cl.
CPC ..... *H04N 21/2743* (2013.01); *H04N 21/4627* (2013.01); *H04N 21/8358* (2013.01); *G06F 2221/0737* (2013.01); *G11B 20/00173* (2013.01)

(58) Field of Classification Search
CPC ........... H04N 21/2541; H04N 21/2743; H04N 21/4627; H04N 21/8358
USPC .......................................................... 726/32
See application file for complete search history.

(56) References Cited

U.S. PATENT DOCUMENTS

| | | | |
|---|---|---|---|
| 5,715,403 A | 2/1998 | Stefik | |
| 5,765,152 A | 6/1998 | Erickson | |
| 5,910,987 A | 6/1999 | Ginter | |
| 5,913,205 A | 6/1999 | Jain et al. | |
| 5,915,250 A | 6/1999 | Jain | |
| 5,918,223 A | 6/1999 | Blum et al. | |
| 6,236,971 B1 | 5/2001 | Stefik | |
| 6,401,118 B1 | 6/2002 | Thomas | |
| 6,466,695 B1 | 10/2002 | Potzsch et al. | |
| 6,574,609 B1 | 6/2003 | Downs | |
| 6,834,308 B1 | 12/2004 | Ikezoye | |
| 6,871,200 B2 | 3/2005 | MacQueen et al. | |
| 6,990,453 B2 | 1/2006 | Wang | |
| 7,003,131 B2 | 2/2006 | Watson et al. | |
| 7,043,473 B1 | 5/2006 | Rassool et al. | |
| 7,047,241 B1 | 5/2006 | Erickson | |
| 7,085,741 B2 | 8/2006 | Lao et al. | |
| 7,113,615 B2 | 9/2006 | Rhoads | |
| 7,197,459 B1 | 3/2007 | Harinarayan et al. | |
| 7,209,892 B1 * | 4/2007 | Galuten ................. G06F 21/10 705/26.62 |
| 7,266,704 B2 | 9/2007 | Levy | |
| 7,363,278 B2 | 4/2008 | Schmelzer et al. | |
| 7,369,677 B2 | 5/2008 | Petrovic et al. | |
| 7,370,017 B1 | 5/2008 | Lindeman et al. | |
| 7,562,012 B1 | 7/2009 | Wold et al. | |
| 7,653,552 B2 | 1/2010 | Vaidyanathan et al. | |
| 7,681,032 B2 | 3/2010 | Peled et al. | |
| 7,702,591 B2 | 4/2010 | Nuttall et al. | |
| 7,730,316 B1 | 6/2010 | Baccash | |
| 7,783,489 B2 | 8/2010 | Kenyon et al. | |
| 7,870,574 B2 | 1/2011 | Kenyon et al. | |
| 7,877,438 B2 | 1/2011 | Schrempp et al. | |
| 8,010,511 B2 | 8/2011 | Brock et al. | |
| 8,411,977 B1 | 4/2013 | Baluja et al. | |
| 8,707,459 B2 | 4/2014 | Brock et al. | |
| 8,738,749 B2 | 5/2014 | Brock et al. | |
| 8,825,518 B2 * | 9/2014 | Levy .................... G06F 21/125 705/14.23 |
| 8,904,464 B1 | 12/2014 | Cox | |
| 8,935,745 B2 | 1/2015 | Brock et al. | |
| 9,031,382 B1 * | 5/2015 | Kaiser .................. G11B 27/00 386/248 |
| 9,031,919 B2 | 5/2015 | Brock et al. | |
| 9,179,200 B2 | 11/2015 | Davis et al. | |
| 9,189,137 B2 * | 11/2015 | Boiman ................. G11B 27/28 |
| 9,342,670 B2 | 5/2016 | Brock et al. | |
| 9,436,810 B2 | 9/2016 | Brock et al. | |
| 9,654,447 B2 | 5/2017 | Brock et al. | |
| 9,785,841 B2 | 10/2017 | Davis et al. | |
| 9,842,200 B1 | 12/2017 | Brock et al. | |
| 2002/0032638 A1 * | 3/2002 | Arora ..................... G06O 30/06 705/37 |
| 2002/0048369 A1 | 4/2002 | Ginter et al. | |
| 2002/0069370 A1 | 6/2002 | Mack | |
| 2002/0082731 A1 | 6/2002 | Pitman et al. | |
| 2002/0082999 A1 | 6/2002 | Lee et al. | |
| 2002/0107806 A1 * | 8/2002 | Higashi ................. G06F 21/10 705/51 |
| 2002/0141578 A1 | 10/2002 | Ripley | |
| 2002/0141582 A1 | 10/2002 | Kocher et al. | |
| 2002/0168082 A1 | 11/2002 | Razdan | |
| 2003/0018709 A1 | 1/2003 | Schrempp | |
| 2003/0023852 A1 | 1/2003 | Wold | |
| 2003/0033321 A1 | 2/2003 | Schrempp | |
| 2003/0037010 A1 | 2/2003 | Schmelzer | |
| 2003/0061490 A1 | 3/2003 | Abajian | |
| 2003/0072491 A1 * | 4/2003 | Sirivara ................. G06F 21/10 382/220 |
| 2003/0086341 A1 | 5/2003 | Wells et al. | |
| 2003/0093790 A1 | 5/2003 | Logan et al. | |
| 2003/0135623 A1 | 7/2003 | Schrempp | |
| 2003/0174859 A1 | 9/2003 | Kim | |
| 2003/0191764 A1 * | 10/2003 | Richards ............... G06F 16/683 |
| 2004/0010417 A1 | 1/2004 | Peled | |
| 2004/0010602 A1 | 1/2004 | Van Vleck et al. | |
| 2004/0022444 A1 | 2/2004 | Rhoads | |
| 2004/0054661 A1 | 3/2004 | Cheung et al. | |
| 2004/0107166 A1 | 6/2004 | Stefik et al. | |
| 2004/0163106 A1 | 8/2004 | Schrempp et al. | |
| 2004/0221118 A1 | 11/2004 | Slater et al. | |
| 2004/0225645 A1 | 11/2004 | Rowney et al. | |
| 2004/0230529 A1 | 11/2004 | Tieu et al. | |
| 2004/0255147 A1 | 12/2004 | Peled et al. | |
| 2004/0267552 A1 | 12/2004 | Gilliam et al. | |
| 2005/0043548 A1 | 2/2005 | Cates | |
| 2005/0043960 A1 | 2/2005 | Blankley | |
| 2005/0044189 A1 | 2/2005 | Ikezoye et al. | |
| 2005/0060643 A1 | 3/2005 | Glass et al. | |
| 2005/0102397 A1 * | 5/2005 | Tsuyama ................. H04N 7/163 709/225 |
| 2005/0102515 A1 | 5/2005 | Jaworski et al. | |
| 2005/0105726 A1 | 5/2005 | Neubauer et al. | |
| 2005/0154678 A1 | 7/2005 | Schmelzer | |
| 2005/0192902 A1 | 9/2005 | Williams | |
| 2005/0193408 A1 | 9/2005 | Sull et al. | |
| 2005/0213790 A1 | 9/2005 | Rhoads et al. | |
| 2005/0246752 A1 | 11/2005 | Liwerant et al. | |
| 2005/0273617 A1 | 12/2005 | Mihcak et al. | |
| 2005/0278473 A1 | 12/2005 | Schmidt | |
| 2006/0010500 A1 | 1/2006 | Elazar et al. | |
| 2006/0034177 A1 | 2/2006 | Schrempp | |
| 2006/0059099 A1 | 3/2006 | Ronning et al. | |
| 2006/0062426 A1 * | 3/2006 | Levy ....................... G06F 21/10 382/100 |
| 2006/0080356 A1 | 4/2006 | Burges et al. | |
| 2006/0112015 A1 | 5/2006 | Chancellor et al. | |
| 2006/0117157 A1 * | 6/2006 | Kitamura ................ G06F 21/10 711/163 |
| 2006/0168614 A1 | 7/2006 | Salas et al. | |
| 2006/0212704 A1 * | 9/2006 | Kirovski ................. G06F 21/16 713/176 |
| 2006/0218126 A1 | 9/2006 | De Ruijter et al. | |
| 2006/0287916 A1 | 12/2006 | Star et al. | |
| 2007/0038567 A1 | 2/2007 | Allaire et al. | |
| 2007/0038578 A1 * | 2/2007 | Liu ......................... G06F 21/10 705/62 |
| 2007/0038931 A1 * | 2/2007 | Allaire ................. G06Q 30/0239 715/206 |
| 2007/0055689 A1 * | 3/2007 | Rhoads ............. G06F 17/30026 |
| 2007/0061393 A1 | 3/2007 | Moore | |
| 2007/0094145 A1 | 4/2007 | Ta et al. | |
| 2007/0098172 A1 | 5/2007 | Levy et al. | |
| 2007/0110089 A1 | 5/2007 | Essafi et al. | |

(56) References Cited

U.S. PATENT DOCUMENTS

| | | | |
|---|---|---|---|
| 2007/0124251 | A1 | 5/2007 | Shimizu et al. |
| 2007/0130580 | A1 | 6/2007 | Covell et al. |
| 2007/0154190 | A1 | 7/2007 | Gilley et al. |
| 2007/0156594 | A1 | 7/2007 | McGucken |
| 2007/0168543 | A1 | 7/2007 | Krikorian et al. |
| 2007/0180537 | A1* | 8/2007 | He ............... G06F 21/10 726/32 |
| 2007/0192352 | A1 | 8/2007 | Levy |
| 2007/0208711 | A1 | 9/2007 | Rhoads |
| 2007/0208751 | A1 | 9/2007 | Cowan et al. |
| 2007/0220575 | A1 | 9/2007 | Cooper et al. |
| 2007/0230486 | A1 | 10/2007 | Zafirov |
| 2007/0234213 | A1 | 10/2007 | Krikorian et al. |
| 2007/0242880 | A1 | 10/2007 | Stebbings |
| 2007/0253594 | A1 | 11/2007 | Lu et al. |
| 2007/0294173 | A1 | 12/2007 | Levy et al. |
| 2008/0008348 | A1 | 1/2008 | Metois et al. |
| 2008/0082405 | A1 | 4/2008 | Martinez et al. |
| 2008/0109306 | A1 | 5/2008 | Maigret et al. |
| 2008/0109369 | A1* | 5/2008 | Su ............... G06Q 10/06 705/59 |
| 2008/0140433 | A1* | 6/2008 | Levy ............... G06F 21/10 705/26.1 |
| 2008/0152146 | A1 | 6/2008 | Conrado et al. |
| 2008/0154739 | A1 | 6/2008 | Kalaboukis |
| 2008/0154965 | A1 | 6/2008 | Pedersen |
| 2008/0155701 | A1 | 6/2008 | Martinez et al. |
| 2008/0162228 | A1 | 7/2008 | Mechbach et al. |
| 2008/0162449 | A1 | 7/2008 | Chao-Yu et al. |
| 2008/0165960 | A1 | 7/2008 | Woo |
| 2008/0209502 | A1 | 8/2008 | Seidel |
| 2008/0215605 | A1* | 9/2008 | Van Leest ............... G06T 1/0035 |
| 2008/0317278 | A1 | 12/2008 | Lefebvre et al. |
| 2009/0006225 | A1 | 1/2009 | Multerer et al. |
| 2009/0030651 | A1 | 1/2009 | Wold |
| 2009/0083228 | A1 | 3/2009 | Shatz et al. |
| 2009/0144325 | A1 | 6/2009 | Chastagnol et al. |
| 2010/0281056 | A1 | 11/2010 | Nonaka et al. |
| 2012/0284803 | A1 | 11/2012 | Wang et al. |
| 2017/0185675 | A1* | 6/2017 | Arngren ............... G06K 9/00744 |

OTHER PUBLICATIONS

Prosecution excerpts of U.S. Appl. No. 14/541,422 (published as US20150074833), including applicant submissions dated Nov. 14, 2014, Jul. 23, 2015, Mar. 10, 2016, Mar. 17, 2016, and Office communications dated Jan. 23, 2015, Oct. 15, 2015, and Mar. 25, 2016.
Brin, et al, Copy detection mechanisms for digital documents, ACM SIGMOD Record, vol. 24, No. 2, 1995.
Krikorian, U.S. Appl. No. 60/823,066, filed Aug 21, 2006 (priority document for 20070168543).
Cano et al, A Review of Audio Fingerprinting, Journal of VLSI Signal Processing, 41, 271-284, 2005.
Fink et al, Social and interactive television applications based on real-time ambient audio identification, 4th European Interactive TV Conference, May 2006, pp. 138-146.
Prosecution excerpts of U.S. Appl. No. 11/512,067 (now U.S. Pat. No. 8,738,749), including applicant submissions dated Aug. 29, 2006, Jun. 22, 2009, Dec. 7, 2009, Apr. 19, 2010, Oct. 1, 2010, Feb. 23, 2011, Aug. 15, 2011, Jan. 12, 2012, and Dec. 16, 2013, and Office communications dated Mar. 17, 2009, Sep. 3, 2009, Jan. 13, 2010, Jun. 25, 2010, Dec. 21, 2010, Apr. 13, 2011, Oct. 13, 2011, Jun. 14, 2013, and Jan. 15, 2014.
Prosecution excerpts of U.S. Appl. No. 11/655,748 (now U.S. Pat. No. 8,707,459), including applicant submissions dated Jan. 19, 2007, May 17, 2010, Nov. 1, 2010, Dec. 19, 2011, Jun. 11, 2012, and Nov. 5, 2013, and Office communications dated Jan. 11, 2010, Jun. 30, 2010, Sep. 19, 2011, Feb. 10, 2012, Jun. 6, 2013, and Nov. 25, 2013.
Prosecution excerpts of U.S. Appl. No. 14/271,297 (now U.S. Pat. No. 8,935,745), including applicant submissions dated May 6, 2014, Sep. 4, 2014, and Oct. 29, 2014, and Office communications dated Jul. 9, 2014, Sep. 9, 2014 and Nov. 21, 2014.
U.S. Appl. No. 60/740,760, filed Nov. 29, 2005 (from which published application 20070124756 claims priority).
U.S. Appl. No. 60/818,182, filed Jun. 30, 2006 (from which U.S. Pat. No. 7,831,531 claims priority).
U.S. Appl. No. 60/771,536, filed Feb. 7, 2006 (from which published application US20090083228 claims priority).
U.S. Appl. No. 60/822,483, filed Aug. 15, 2006 (from which published application US20080109306 claims priority).
U.S. Appl. No. 60/823,881, filed Aug. 29, 2006 (from which published application 20070124756 claims priority).
U.S. Appl. No. 60/856,501, filed Nov. 3, 2006 (from which published application US20140020116 claims priority).
Bruno, et al, Video Structuring, Indexing and Retrieval Based on Global Motion Wavelet Coefficients, 16$^{th}$ Int'l IEEE Conf. on Pattern Recognition, 2002 (vol. 3, pp. 287-290).
Robles, et al, Towards a Content-Based Video Retrieval System Using Wavelet-Based Signatures, 7$^{th}$ IASTED International Conference on Computer Graphics and Imaging, 2004 (pp. 344-349).
Loupias, et al, Wavelet-Based Salient Points: Applications to Image Retrieval Using Color and Texture Features, int'l Conference on Advances in Visual Information Systems, Nov. 2, 2000 Nov. 2 (pp. 223-232).
Moghaddam et al, Wavelet Correlogram: A New Approach for Image Indexing and Retrieval, 2d Conf. on Machine Vision, Image Processing and Applications, Feb. 2003.
Li, et al, Content-Based Indexing and Retrieval of Audio Data Using Wavelets. IEEE Int'l Conf. on Multimedia and Expo, 2000 (vol. 2, pp. 885-888).
Subramanya, et al, Wavelet-Based Indexing of Audio Data in Audio/Multimedia Databases, IEEE Int'l Workshop on Multi-Media Database Management Systems, 1998. (pp. 46-53).
Ke, et al, Efficient Near-Duplicate Detection and Sub-Image Retrieval, ACM Multimedia, Oct. 10, 2004 (vol. 4, No. 1, p. 5).
Cheung, et al, Efficient Video Similarity Measurement with Video Signature, IEEE Trans. on Circuits and Systems for Video Technology, 13.1, pp. 59-74, 2003.
*Aatrix Software Inc.* v. *Green Shades Software, Inc.*, (Fed. Cir., Feb. 14, 2018).
Baluja, Shumeet, and Covell, Michele, Content Fingerprinting Using Wavelets, 3rd European Conference on Visual Media Production, Nov. 2006.
*Berkheimer* vs. *HP Inc.*, (Fed. Cir., Feb. 8, 2018).
*Google Inc.* v. *Network-1 Technologies, Inc.* (Fed. Cir., Jan. 23, 2018).
*Google Inc.* v. *Network-1 Technologies, Inc.*, CBM2015-00113, U.S. Pat. No. 8,904,464, PTAB Final Written Decision of Oct. 18, 2016.
Jacobs et al, Fast Multiresolution Image Querying, Proc. SIGGRAPH, 1995.

* cited by examiner

300

400

Attributor  Home  Matches  My Content   Greg56@yahoo.com
Content Manager | Add Content   My Account | Help | Sign Out

Add Content

My content
This is a required entry.
Please tell us the location of your content. If your content has a feed associated with it (e.g., an RSS feed for a blog), please enter the URL for the feed.

○ Enter the URL for your content or upload files.
   [ www.mysite.com ]
   Does your content require a username and password to access it? Yes ○ Automatically add all of your content at any of the following services:
   [Choose... ▼]  Enter User ID for this service: [      ]

Amount of content
This is a required entry.
We'll include all existing content and automatically get any additions and changes you make to content.

○ Entire website under this URL (including subdirectories)
○ This URL (or feed) only

Nickname
[                                    ]

Folder
Choose the folder in which you'd like this content placed. Select from the menu of folders you've already created, or create a new folder.

○ Use a folder you've already created
   [Select a folder... ▼]
○ Create a new folder
   [                    ]

Rules of use
This is a required entry.
Choose the rules under which someone
can re-use your content.

- ⦿ Make My Own Rules Learn more
  - ⦿ Attribution Required
  - ○ Attribution Not Required
  - ○ Commercial Use OK
  - ○ Commercial Use OK if user shares [   ] % of the revenue generated from products and services that use my content
  - ⦿ No Commercial Use
  - ☑ Limit text copied to [ 20% ▼ ] or less of the Source
  - ☑ No Changes may be made to my content
  - ☐ Contact me first for permission
  - ☐ Share alike
- ○ Creative Commons License [ Select License... ▼ ]
- ○ All Rights Reserved
- ○ Public Domain

| Showing: All Matches ▽ | Sort by: Similarity Score ▽ |

502
Controlled | Match
Camera 1 | Camera 2
www.example1.com
Similarity Score: 98
Non-Compliance Score: 88

504
Controlled | Match
Text 1 | Text 2
www.example2.com
Similarity Score: 78
Non-Compliance Score: 87

. . .

Controlled | Match
Camera 3 | Camera 4
www.example3.com
Similarity Score: 92
Non-Compliance Score: 81

Controlled | Match
Text 3 | Text 4
www.example4.com
Similarity Score: 76
Non-Compliance Score: 98

. . .

Add Additional Controlled Content

Controlled Content: [          ]

Email Address: [          ]

[Add Content]

FIG. 5

CUSTOMIZED HANDLING OF COPIED CONTENT BASED ON OWNER-SPECIFIED SIMILARITY THRESHOLDS

RELATED APPLICATION DATA

This application is a continuation of application Ser. No. 14/258,633, filed Apr. 22, 2014 (now U.S. Pat. No. 9,654,447), which is a continuation of application Ser. No. 11/655,748, filed Jan. 19, 2007 (now U.S. Pat. No. 8,707,459). Application Ser. No. 14/258,633 is also a continuation-in-part of application Ser. No. 11/512,067, filed Aug. 29, 2006 (now U.S. Pat. No. 8,738,749). The disclosures of U.S. Pat. Nos. 9,654,447 and 8,707,459 are each incorporated herein by reference.

BACKGROUND

Content, such as text, images, and video, may be stored and displayed on the Internet. For example, an online service provider (OSP), such as GOOGLE Inc. or YOUTUBE LLC, may display images as a result of a text based image search or video posted by users. There are many cases in which content on the Internet is being used in a non-compliant way. Non-compliant content may include material that violates third party copyrights or trademarks, is illegal (e.g., child pornography), or otherwise does not comply with a content owner's terms of use or with an OSP policy. Examples of potentially non-compliant use of content include bloggers copying text from news reports, EBAY sellers copying other seller's listing content, aggregators republishing listings from other sites, spammers using copyrighted text to create web pages to influence search results and generate advertising revenue, or even innocent/accidental use of non-compliant content by a conscientious consumer.

Content on the Internet is difficult to monitor for compliance. Typically, a content owner manually monitors the Internet for copies of the owner's content through repetitive queries in search engines like GOOGLE Inc. In some cases, the use of the owner's content is permissible under their own license terms or under legal principles such as the copyright concept of "fair use," which considers such factors as whether attribution has been provided, what portion of the content has been used without permission, and whether the content has been used for commercial purposes (such as generating advertising or subscription revenue). Content owners have no automated methods to evaluate the context in which their content is used by others.

Even when non-compliant use of content is detected, typically it is difficult to remedy. In the case of copyright non-compliance, the content owner's objective usually is to cause the content to be removed from third-party services that host the content or search engines which refer users to it through their indices. This typically is a manual process which involves submitting a notice under the Digital Millennium Copyright Act (DMCA). The DMCA provides OSPs and search engines with a safe harbor from copyright infringement liability if they promptly remove content from their service upon request by the content owner. Therefore, when a content owner finds a copy of his content, he can choose to send a take down notice under DMCA by writing a letter or an email to the OSP or search engine. In response, the OSP or search engine typically must manually remove the content from their service to avoid liability.

From an OSP's perspective, monitoring for content that does not comply with the OSP's host policy is also typically a manual process. When OSPs monitor content as it is uploaded, typically a human views and approves content before (or after) it is displayed and non-compliant content is rejected (or removed). OSPs also must manually review and compare content when they receive DMCA notices, and often have little information to determine if content is out of compliance and no automated way to determine the identity or reputation of the complaining party. As the amount of content on the Internet grows, manual content monitoring and enforcement processes are becoming increasingly impractical. Therefore, improved methods for monitoring content and managing enforcement of non-compliant content are needed. In addition, there currently exists no means to automatically verify content ownership, e.g., for the purpose of facilitating the negotiation, transaction, and/or enforcement of content license(s), and a solution to this problem would also be desirable.

BRIEF DESCRIPTION OF THE DRAWINGS

Various embodiments of the technology are disclosed in the following detailed description and the accompanying drawings.

FIG. 4A is an example of a GUI for providing controlled content.

FIG. 4B is an example of a GUI for providing usage rules.

FIG. 5 is an example of a GUI for displaying search results.

DETAILED DESCRIPTION

The technology can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the technology may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the technology.

A detailed description of one or more embodiments of the technology is provided below along with accompanying figures that illustrate the principles of the technology. The technology is described in connection with such embodiments, but the technology is not limited to any embodiment. The scope of the invention is limited only by the claims and the invention encompasses numerous alternatives, modifications and equivalents. Numerous specific details are set forth in the following description in order to provide a thorough understanding of the technology. These details are provided for the purpose of example and the technology may be practiced according to the claims without some or all of these specific details. For the purpose of clarity, technical material that is known in the technical fields related to the technology has not been described in detail so that the technology is not unnecessarily obscured.

Figure 1:
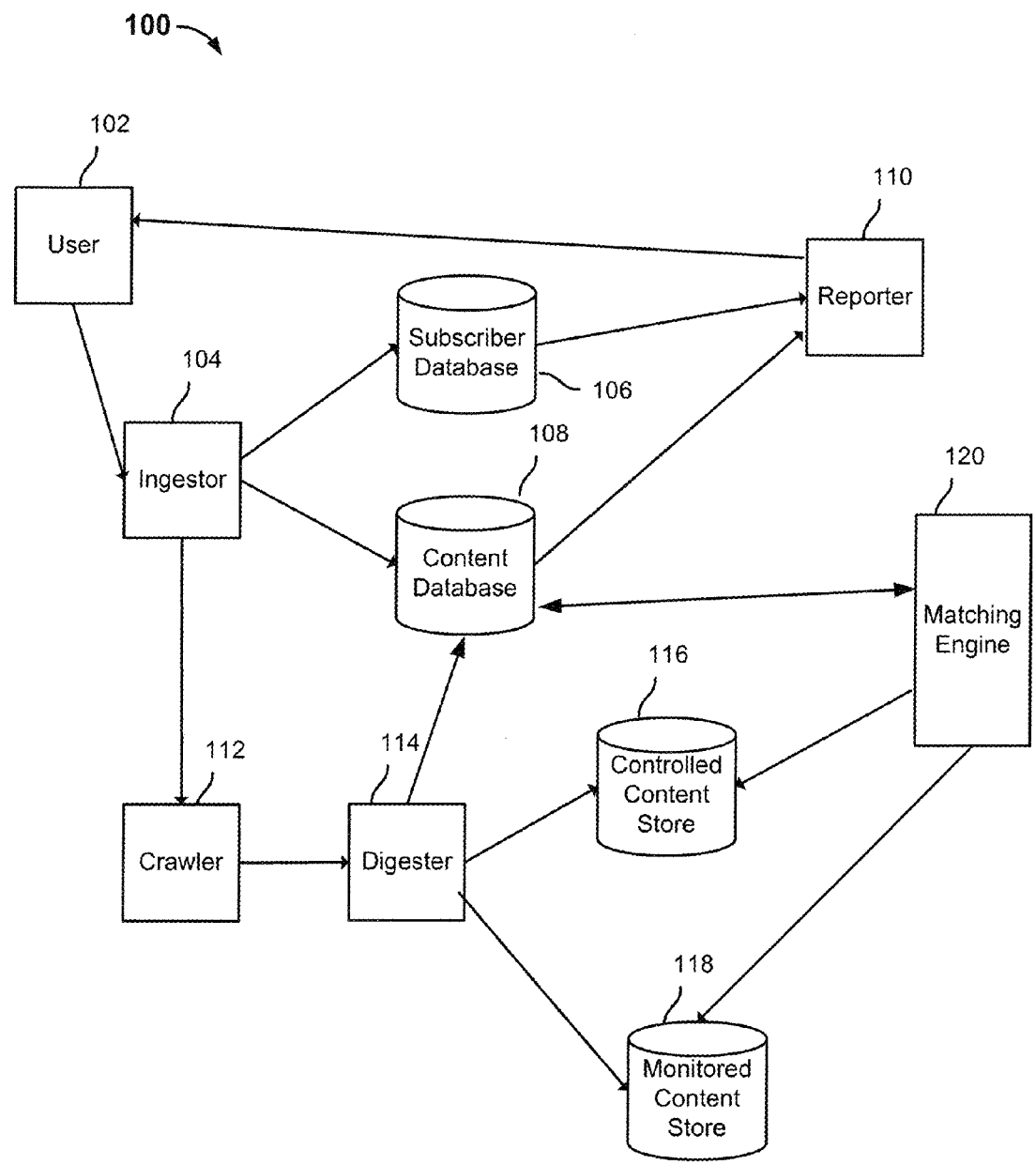
FIG. 1 is a block diagram illustrating an embodiment of a content monitoring system.

FIG. 1 is a block diagram illustrating an embodiment of a content monitoring system. In some embodiments, content monitoring system 100 is used by a content owner to monitor for non-compliant use of the content owner's content based on usage rules specified by the content owner. Examples of content owners include: a photographer (e.g., Ansel Adams), a film studio (e.g., THE WALT DISNEY COMPANY), or a columnist (e.g., Walter Mossberg), or a media outlet (e.g., THE WALL STREET JOURNAL). The content owner is not necessarily the same as the content creator. Usage rules (including usage policies, terms of use, usage terms, etc.) are a set of rules regarding conditions under which content may be used, as specified by the content owner. Usage rules may vary depending on the content and/or the content owner and applicable law (such as "fair use"). Usage rules are more fully described below.

In some embodiments, content monitoring system 100 is used by a content host to monitor for non-compliant use of content based on a host policy specified by the content host. A content host refers to an entity that hosts, serves, stores, provides, and/or displays content. Examples of content hosts include OSPs, such as search engines (e.g., GOOGLE Inc.), photo or video sharing websites (e.g., YOUTUBE LLC, YAHOO Inc.), and blogging sites (e.g., TYPEPAD). As used herein, an OSP is an entity that hosts and/or serves or provides content on behalf of itself or other entities. For example, an OSP includes an OSP as defined under DMCA. An OSP includes an electronic content management system (ECM). A host policy is a set of rules regarding conditions under which content may be hosted, as specified by a content host. A host policy may vary depending on the content host. As an example of a host policy, OSPs may have policies that apply to the posting of content by their users, in which they reserve the right to remove content or users in the event of non-compliance (determined at their discretion). In some embodiments, a configurable host policy governs the automatic handling of DMCA notices, as more fully described below.

A content user includes an entity that uses content that is not owned by the content user. A content user includes an entity that owns or posts content. Examples of content users include writers, photographers, bloggers, or any user who posts content on content hosts.

Controlled content refers to content associated with one or more compliance rules, where compliance rules include usage rules specified by a content owner and/or host policy rules specified by a content host. In the case where a content owner is monitoring for use of his content, controlled content is the content owner's content. In the case where a content host is monitoring for non-compliant content, controlled content is content that is non-compliant with the host policy. Monitored content refers to the set of content being searched (i.e., potential matches). In other words, content monitoring system 100 searches monitored content for use of controlled content. As used herein, a match, copy, or use of controlled content does not necessarily refer to an identical match, an identical copy, or use of identical content. A match, copy, or use of controlled content is identified based on criteria such as similarity scores and non-compliance scores, as more fully described below.

Compliant content refers to content that satisfies usage rules associated with the content. In the case where a content host such as an OSP is monitoring for non-compliant content, compliant content refers to content that not only satisfies the usage rules, but also satisfies the host policy of the content host (e.g., the OSP).

As used herein, a unit of content may be referred to as a content object. Content objects can include any object type. Examples of content objects include a text document, an image, video, audio, flash, animation, game, lyrics, code, or portions thereof (e.g., a phrase/sentence/paragraph, a sub-image, or a video clip). Other examples include a single file (e.g., an image), all of the text on a web page (e.g., a news article), a chapter in a book, and a blog entry. The content object may be in various audio, image, or video formats, such as MP3, JPEG, MPEG, etc.

Content monitoring system 100 can be used to find copies of a set of content at a given point in time or regularly monitor for matches. Content monitoring system 100 may be used to monitor data associated with the Internet or any other appropriate environment in which there is a need to monitor content for compliance. Examples of appropriate environments include the Internet, an Intranet, a firewalled network, a private network, an Electronic Data Interchange (EDI) network, an ad hoc network, etc.

As shown, user 102 provides input to ingestor 104. Ingestor 104 provides input to subscriber database 105, content database 108, and crawler 112. Reporter 110 receives input from subscriber database 105 and content database 108. Crawler 112 provides input to digester 114. Digester 114 provides input to content database 108, controlled content store 116, and monitored content store 118. Matching engine 120 provides input to controlled content store 116 and monitored content store 118. Content database 108 interacts with matching engine 120.

Content ingestor 104 accepts controlled content from user 102. User 102 includes content owners or administrators of content monitoring system 100. The content may be specified in various ways. A user interface (UI) may be provided for user 102 to specify content. In some embodiments, the UI provides an interface for uploading content or specifying a link/set of links to the content, where the links may be local (e.g., on a local hard drive) or remote (e.g., on a remote server or on the Internet). An example of a remote link is a user's EBAY account. User 102 may display, in his EBAY store, images to be monitored. For example, user 102 is a photographer selling his photography. Using the UI, user 102 specifies a URL to the EBAY store or particular auction. In some embodiments, instead of providing a URL to a particular auction, the content owner provides their username (such as an EBAY seller ID), which allows the system to retrieve all of the user-posted content associated with that username, which could be associated with one or more auctions. In some embodiments, the content owner also provides a password if necessary or expedient to locate user-posted content. In some embodiments, a schedule for fetching content may be specified. For example, crawler 112 may be configured to fetch images from the user's EBAY store every 24 hours. The raw content is passed to digester 114 for processing and storage.

In some embodiments, the ingesting of content is automatically triggered by content creation. For example, when a blogger posts a new entry, it is automatically ingested. When a writer updates a Word document, the content is automatically ingested.

In some embodiments, if the URL or username provided by the content owner contains some content of third parties, the user is presented with a means to exclude or include specific content objects (such as a single image) from monitoring and from the content owner's usage rules.

The controlled content may be from the Internet or from another source. A manual or automated API may be used to ingest content or perform any of the other processes described herein. A URL or any other appropriate identifier may be used to specify content. Credentials associated with accessing the content, such as a password, may be provided.

Besides controlled content, other data may be provided as input to content monitoring system 100, such as links (e.g., URLs or websites) identified by an administrator, content host, or content owner. These sites may have been identified because the user is aware of a specific instance of non-compliance at that location, they have historically posted non-compliant content or are of particular concern to the user. Other examples of additional data that may be input to content monitoring system 100 are more fully described below.

Crawler 112 fetches content from the network. The content to be fetched may include the Internet, a subset of the Internet, a complete domain, or a single piece of content from the web. Identifiers may be used to identify the content to be fetched. Some examples of identifiers include: a URL, a directory, a password protected website(s), all items for a seller on eBay, and all content of a given type or format (e.g., images only or JPEGs only). In some embodiments, crawler 112 is used with modules that provide different rules for crawling. In some embodiments, crawler 112 fetches content according to a specified schedule.

Controlled content store 116 includes controlled content. In some embodiments, controlled content store 116 includes the following information: a copy of the content, an index of fingerprints associated with the content, and metadata about the content (e.g., filename, URL, fetch date, etc.). In some embodiments, the copy of the content is stored in a separate cache. A fingerprint includes a signature of an object that can be used to detect a copy of an object as a whole or in part. A content object may have more than one fingerprint. A fingerprint may be associated with more than one content object. A fingerprint may be associated with a whole or part of a content object. A fingerprint may be multidimensional. For example, there may be multiple features associated with a fingerprint. A fingerprint may contain multiple fingerprints or subfingerprints.

Monitored content store 118 is a repository for crawled data. Monitored content store 118 may include any digital object collection or environment. In some embodiments, monitored content store 118 is a web store. In some embodiments, there are multiple content stores, e.g., one for each kind of data—text, images, audio, video, etc. In some embodiments, monitored content store 118 includes data from sites that copy the most often, and is updated most frequently. This data may be indicated as such (i.e., tagged or flagged as common copier) or stored separately. In some embodiments, a real-time store (not shown) is used to store various feeds coming in (e.g., from a content owner's blog each time the blog is updated, or from a content owner's EBAY store every 24 hours). In some embodiments, a ping server or similar server is used to update feeds coming in. If the feeds contain links, the content is fetched by crawler 112. Over time, data moves from the real-time store to monitored content store 118 as it becomes older. Monitored content store 118 changes periodically, whereas the real-time store keeps changing as content comes in. In some embodiments, external stores (not shown), such as search engines, are accessed using application programming interfaces (APIs). Once data is fetched, they are stored in monitored content store 118. Some embodiments of this are more fully described below. In some embodiments, fingerprints of content are stored in monitored content store 118. In some embodiments, the GIGABLAST service is used to fetch and store content data.

Digester 114 receives content fetched by crawler 112, including controlled content or monitored content, analyzes, and processes it. Analysis of content is more fully described below. The content and associated metadata is stored in controlled content store 116 or monitored content store 118, as described above.

In some embodiments, matching engine 120 finds matches to controlled content by comparing controlled content from controlled content store 116 with monitored content from monitored content store 118 based on matching techniques including technical factors, compliance factors, and other factors, as more fully detailed below.

Reporter 110 reports match results to user 102 or an administrator of content monitoring system 100. Various user interfaces may be used. Examples of reporting and UIs for reporting results are more fully described below.

Subscriber database 106 contains information about customers. Content database 108 contains references to controlled content and to matched content corresponding to the controlled content. In some embodiments, a separate database is used for matched content.

In some embodiments, content monitoring system 100 is used as a content clearinghouse by content users wishing to use content. Before using a particular content object (i.e., unit of content), the content user checks with content monitoring system 100 to determine whether the conditions under which the content user wishes to the use the content complies with the usage policy set by the content owner.

Content monitoring system 100 may be implemented in various ways in various embodiments. For example, controlled content, web data, subscriber data, and/or content data may be organized and stored in one or more databases. Ingesting, crawling, digesting, matching, and/or reporting may be performed using one or more processing engines.

In some embodiments, any of the functions provided by content monitoring system 100, such as ingesting, crawling, digesting, matching, and reporting, may be provided as a web service. For example, content monitoring system 100 or an element of content monitoring system 100 is queried and provides information via XML.

Figure 2A:
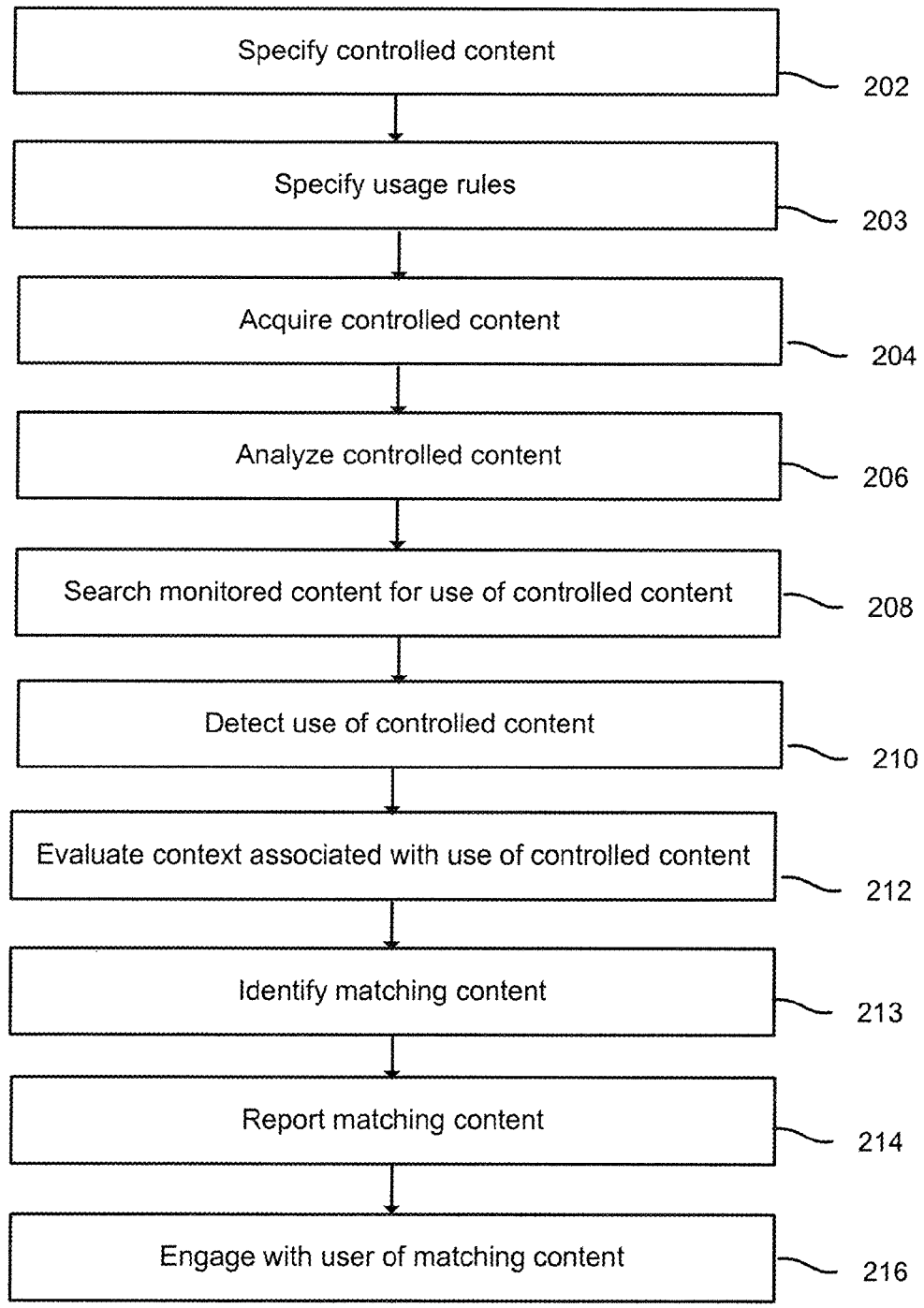
FIG. 2A is a flow chart illustrating an embodiment of a process for monitoring content.

FIG. 2A is a flow chart illustrating an embodiment of a process for monitoring content. In some embodiments, this process is performed when a content owner is searching or monitoring for non-compliant use of the owner's controlled content. In some embodiments, this process is performed by content monitoring system 100.

In the example shown, the process begins at 202, and controlled content is specified. Controlled content may include text, images, video, or any other type of data. Controlled content may be specified in various ways, such as content located in a particular directory and/or all content contributed by a particular user (e.g., on the EBAY service). A user (e.g., a content owner or an administrator) may specify controlled content using any appropriate interface. Examples of graphical user interfaces are described more fully below. The user may also request a one time search or regular monitoring for the controlled content. In the case of the latter, the user may specify options related to regular monitoring, such as frequency of monitoring, how often reports should be received, etc.

At 203, usage rules are specified. Usage rules include conditions under which a content owner permits the use of owned content. Usage rules may include terms under which a content owner permits the republication and/or modification of content. Usage rules may include different conditions depending on whether the use is for commercial or non-commercial uses, business or education uses, with or without attribution, in a limited amount, in a limited context, etc. The usage rules may be based on any appropriate compliance structure, such as "fair use," "copy left," "share alike," Creative Commons specified structures, user specific compliance rules, rules against associating the controlled content with objectionable content (e.g., obscenity, adult content, child pornography), rules requiring attribution, moral rights, rights of personality, or any legal or personal compliance structure. A usage rule may take into account editorial context. In other words, certain uses may be permitted that are not permitted in another context. For example, if the controlled content object is a book, portions from the book may be permitted to be used in a book review but not in another context (where other rules may apply).

A variety of user interfaces may be used to specify usage rules. For example, a list of terms, checkboxes (to apply a rule), and settings (specific to a rule) may be provided. The list may include, for example: whether attribution is required, amount of duplication allowed, whether commercial use is allowed, whether changes are allowed, whether permission is required, whether derivative content is allowed, geographical requirements, whether the owner requires advertisement revenue sharing (e.g., using Google AdSense) and associated terms and information, etc. The usage rules may be hierarchical. For example, a list of higher level rules or compliance structures may be displayed for selection, each of which may be expanded to display lower level rules that each of the high level rules comprises. Usage rules may have any number of levels. Checkboxes (or another appropriate object) may be located next to the higher level or lower level rules and may be selected (e.g., checked off) at any level of granularity. For example, selecting checkboxes next to a higher level rule automatically selects all corresponding lower level rules. Alternatively, lower level rules may be individually selected. An example of a higher level rule is a particular type of license. Lower level rules under the license include the specific usage rules associated with the license.

Usage rules may be customized for each content owner (and for each content object). In some embodiments, a unique URL is provided to the content owner for his use (e.g., to include as a link associated with an icon placed in proximity to his content on his website, in his eBay store, etc.) When a content user wishes to use content on the content owner's website, the content user can then select the link, which leads to a page describing the content owner's usage rules (for that content object).

In some embodiments, rather than providing a unique URL to the content owner, the content owner could use a particular URL on his website or web page. For example, the particular URL could be "rules.attributor.com." When a content user wishes to use content on the content owner's website, the content user can select the link, which leads to a page describing the content owner's usage rules (for the website or content on the website). In this case, the content monitoring system determines from which website the link was selected and can determine which usage rules to display. In some embodiments, the same URL is common to multiple content owner's websites. Further examples are discussed below.

Usage rules may be stored in the content monitoring system. For example, the usage rules for content owners may be stored in controlled content store 116 (e.g., as metadata associated with the content object) or in subscriber database 106.

At 204, controlled content is acquired. In some embodiments, 204 is performed by ingestor 104 in system 100. In various embodiments, controlled content is obtained from a source specified at 202. For example, controlled content is obtained from a particular directory or from one or more servers containing content contributed by a particular user. Controlled content acquisition may be automated or non-automated. For example, an automated process could poll for updates and acquire controlled content when an update is detected. In some embodiments, a ping server is used to detect updates. In some embodiments, controlled content is continuously acquired or ingested. For example, if the controlled content is specified as all content contributed by a particular user on the EBAY service, then when the user contributes new content to the EBAY service, that content is automatically acquired or acquired at configured times or time intervals. A variety of APIs may be used to acquire controlled content. In some embodiments, after controlled content is acquired, the user is given an opportunity to confirm that it is the correct controlled content or the controlled content the user intended. The acquisition of controlled content may involve any network, protocol (e.g., UDP, TCP/IP), firewall, etc.

At 206, controlled content is analyzed. In some embodiments, 206 is performed by digester 114 in system 100. In some embodiments, the acquired content is analyzed for unique identifying features. Any appropriate technique may be used to extract features from the content. For example, a fingerprint associated with the content may be determined. The technique may depend on the media type (e.g., spectral analysis for audio/video, histogram or wavelets for images/video, etc.) For example, in the case of text content, various techniques may be used, such as unique phrase extraction, word histograms, text fingerprinting, etc. An example is described in T. Hoad and J. Zobel, "Methods for identifying versioned and plagiarized documents," in Journal of the American Society for Information Science and Technology, Volume 54, Issue 3, 2003. In the case of image content, various techniques may be used, including key point identification, color histograms, texture extraction, image signatures, or extraction of any other feature. An example is described in Y. Ke, R. Sukthankar, and L. Houston, "Efficient near-duplicate detection and sub-image retrieval," in ACM Multimedia. ACM, October 2004, pp. 1150-1157. In the case of video content, a video fingerprinting technique may be used. In another example, a signature is formed for each clip by selecting a small number of its frames that are most similar to a set of random seed images, as further described in S.-C. Cheung, A. Zakhor, "Efficient Video Similarity Measurement with Video Signature," Submitted to IEEE Trans. on CSVT, January, 2002. In the case of audio content, an audio fingerprinting technology may be used. For example, a spectral signature is obtained and used as input to a hash function. In various embodiments, other techniques may be used. Analyzing may include determining spectral data, wavelet, key point identification, or feature extraction associated with the controlled content. In some embodiments, results from the analysis are stored in controlled content store 116 in system 100.

At 208, monitored content is searched for use of controlled content. In some embodiments, monitored content is specified by a user, such as a content owner or administrator. The entire web may be searched, or a subset of the web (e.g., websites that have been identified as sites that copy the most often or data in a content store such as monitored content store 118). A database of sites that have been crawled and resulting data may be maintained that is updated at various times. Rather than searching the entire web, the database may be used instead. Searching may comprise a combination of searching the web and consulting a database of previously crawled websites. In some embodiments, monitored content store 118 in system 100 stores previously crawled websites. In some embodiments, 208 is performed by crawler 112 in system 100.

Searching may be performed in one or more stages, each stage refining the search further. For example, a first search may yield a first set of candidate content objects. A second search searches the first set of candidate content objects to yield a second set of content objects, and so forth. Eventually, the final set of content object(s) includes the content object(s) that match or most closely match the controlled content object. In some embodiments, less expensive and/or less complex techniques may be used to obtain candidate sets followed by one or more tighter, smaller granularity techniques to progressively enhance the resolution of the analysis. Which techniques may be used and in which order may be determined based on cost and/or complexity. In some embodiments, the second search comprises a manual search. For example, the second set of content objects may be a smaller set and may be searched by a human.

In some embodiments, a hash structure is used to obtain a candidate set of content objects. For example, a hash table is maintained such that similar content objects are hashed to the same or a nearby location in a hash table. This way, to search for content object A, a hash function associated with A is computed and looked up in a hash table, and a set of objects that are similar to A is obtained. A hash function associated with a content object may be computed in various ways. The hash function may be computed differently depending on the type of content object or one or more characteristics of the content object. For example, if the content object is a text document, a fingerprinting technique specific to text may be used to obtain a fingerprint of the document. The fingerprint may be input to the hash function to obtain a hash value that corresponds to a group of other content objects that have a similar fingerprint. Hash values that are nearby in the hash table correspond to content objects that have similar (though less similar than those in the same hash bin) fingerprints, to create a clustering effect. In this way, a candidate set of content objects may be obtained.

Other techniques such as cosine similarity, latent semantic indexing, keyword based methods, etc., may also be used.

In some embodiments, existing search engines or search facilities on websites, such as EBAY, are used to obtain a candidate set of documents. This approach may be useful in an initial implementation of the system. For example, APIs provided by GOOGLE Inc. or other search engines may be used to perform this search. For example, to search for a document, a unique phrase within the document is selected. The unique phrase is input to a GOOGLE search using a GOOGLE API and the results are a candidate set of documents. Multimedia search engines (e.g., video, image) may be used to obtain a candidate set of documents. In the case of images, an image search engine may be used to obtain a candidate set of images. For example, Riya (www.Riya.com) includes an image search engine that may be used to obtain a candidate set.

In some embodiments, besides the Internet, databases may be searched using these techniques. Some examples of databases include Factiva, Corbis, and Hoover's. Although these databases do not allow indexing of their documents, they do have a search interface. This search interface may be used to perform searches for content using unique phrase extraction. For example, articles in the Factiva database containing a unique phrase from a controlled content object are more likely to be a match. A subsequent search may be performed by obtaining the full text of the articles and searching them using more refined techniques. Searching this way limits having to crawl the entire Internet. Also the more computationally intensive search techniques are limited to a smaller search space.

In some embodiments, once a candidate set of content objects is obtained, one or more refining searches are performed. For example, the candidate set of documents are crawled and advanced matching techniques can be applied to the candidate set of documents. A variety of content or document similarity techniques may be used. For example, the techniques described at 206 may be used on the candidate set of content objects.

In the case of text documents, a refining search may comprise computing a signature for each paragraph or other data set. A Levinstein distance could be used to determine the similarity between a document and the controlled content object. A byte by byte comparison could be used. Other techniques, such as anchoring or cosine similarity may be used, as described more fully in T. Hoad and J. Zobel, "Methods for identifying versioned and plagiarized documents," in Journal of the American Society for Information Science and Technology, Volume 54, Issue 3, 2003. Techniques such as PCA-sift or feature extraction of color, texture and signature generation may be used. For example, A. C. Popescu and H. Farid, "Exposing Digital Forgeries by Detecting Duplicated Image Regions, Technical Report, TR2004-515, Dartmouth College, Computer Science describes examples of such techniques.

In the case of images, images may be subsampled to be robust against cropping and subimage reuse using techniques such as key pointing (or key point extraction), which looks for unique signatures within a portion of an image, such as edges or extreme color gradations, and samples these portions to obtain a signature. Another way is to subsample distinctive portions of a color histogram of the image.

In some embodiments, different techniques are used depending on characteristics of the content object. For example, if a document has fewer than 20 paragraphs, a byte by byte comparison may be used. If a document has 20 or more paragraphs, a different technique may be used. Sampling and anchoring points may depend on the format of the document.

At 210, use of controlled content is detected. In some embodiments, 210-213 are performed by matching engine 110 in system 100. In some embodiments, detection is based on various criteria associated with technical factors that may result from searching at 208. An example of a technical factor is a similarity score. A similarity score is a measure of the similarity between two content objects and may be computed in a variety of ways. For example, the Levinstein distance is a similarity score. In some embodiments, if similarity scores meet one or more criteria, use of controlled content is detected. The criteria may be configurable by the user or administrator. One or more similarity scores may be computed for a controlled object and candidate object to represent various characteristics of the content. In some embodiments, one or more similarity scores may be weighted and combined into a single similarity score.

A similarity score may account for various degrees of copying. For example, the first and last paragraph of a document may be copied, a portion of a document may be copied, or the whole document may be copied. Different samples of music may be copied into a single audio file. Videos may be mixed from copied videos. One controlled document may have 15 samples, one or more of which may be copied. A similarity score may account for these factors. For example, a copying extent score may be used to indicate the percentage of a controlled content object that has been copied. A copying density score may be used to indicate the percentage of a match that is comprised of a controlled content object.

At 212, a context associated with the use of the controlled content is evaluated. The context refers to any attribute associated with the use of the content object. For example, the context includes compliance factors, technical factors, and reputation information. Context may be automatically and/or manually determined.

Compliance factors are based on usage rules specified by content owners. For example, compliance factors include information related to attribution and commercial context. Examples of compliance factors include whether the site is government, education, commercial, revenue producing, subscription based, advertising supported, or produces revenue in some other way (e.g., using a reputation bartering scheme associated with a compensation mechanism). This can be determined manually or automatically. For example, a human could review the website, or based on the top level domain (e.g., .edu, .com, .org), or the presence of advertising related HTML code, it can be determined whether the website is commercial.

Thus, in accordance with one aspect, the present technology comprises a system for evaluating content. Such system includes a processor configured to: determine a host policy associated with one or more host policy rules (wherein the host policy specifies one or more conditions under which the content may be hosted); automatically assess compliance with the one or more host policy rules based at least in part on a context associated with the use of the content; and combine the compliance assessments to make a compliance evaluation. Such system further includes a memory coupled with the processor, where the memory provides the processor with instructions.

In another aspect, the present technology comprises a computer program product for evaluating content. Such computer program product is embodied in a computer readable medium and comprises computer instructions for: determining a host policy associated with one or more host policy rules (wherein the host policy specifies one or more conditions under which the content may be hosted); automatically assessing compliance with the one or more host policy rules based at least in part on a context associated with the use of the content; and combining the compliance assessments to make a compliance evaluation.

In some embodiments, a non-compliance score is computed to represent the likelihood that a content object is non-compliant based on the compliance factors. In some embodiments, multiple compliance factors are used to determine a non-compliance score. For example, the non-compliance score takes multiple compliance factors, normalizes and weighs each one as appropriate, and takes the sum. In some embodiments, the weighting is based on usage rules and/or host policy rules. In addition an overall weight may be used to scale the non-compliance score. For example, content found on educational sites may be weighted differently. One or more non-compliance scores may be computed.

Besides technical factors and compliance factors, examples of other factors include reputation information. For example, a reputation database is maintained that includes reputation ratings of content users by other content owners. For example, Bob's blog may have a low reputation because it has posted numerous copyrighted content objects owned by others who have given Bob's blog a low reputation rating.

At 213, matching content (i.e., match content object(s)) is identified based on detection at 210 and/or evaluation at 212. As previously described, a match, copy, or use of controlled content does not necessarily refer to an identical match, an identical copy, or use of identical content.

In some embodiments, a match is a technical match and is selected based only on technical factors, such as similarity scores. In this case, technical matches are identified at 210, and at 212, the technical matches are evaluated based on context to determine whether they are compliant.

In other embodiments, a match is selected based on configurable criteria associated with technical factors (e.g., similarity scores), compliance factors (e.g., non-compliance scores), and/or other factors (e.g., reputation information). In some embodiments, it is determined that content objects with one or more similarity scores that exceed a similarity score threshold and one or more non-compliance scores that exceed a non-compliance score threshold are matches. In other words, a content object that is technically similar, but is compliant with applicable usage rules, would not be considered a match. In some embodiments, it is determined that any content object with one or more similarity scores that exceed a similarity score threshold is a match.

In some embodiments, a binary flagging is used. For example, it is determined that content objects with one or more similarity scores that exceed a similarity score threshold and/or one or more non-compliance scores that exceed a non-compliance score threshold are "interesting" and other content objects are "non-interesting." In some embodiments, "interesting" content objects are reported to the user at 214.

At 214, content is reported to the user (e.g., content owner). In some embodiments, which content to report is configurable and may depend on criteria based on technical factors (e.g., similarity scores), compliance factors (e.g., non-compliance scores), and/or other factors (e.g., reputation information). In some embodiments, matching content as identified at 213 is reported to the user. In some embodiments, a user views and manually confirms whether each matching content object is non-compliant. The results may be stored in a common database.

In some embodiments, 214 is performed by reporter 110 in system 100. Various interfaces could be used. Screenshots, links, buttons, tabs, etc. may be organized in any appropriate fashion. In some embodiments, a user interface is presented to the user that shows the matching content, one or more similarity scores, and one or more non-compliance scores. Example interfaces for reporting results are more fully described below.

In some embodiments, the interface provides a way for the user to confirm that content is the user's content or reject the content (i.e., indicate a false positive). This data may be fed back into the monitoring process. For example, this information may be stored in a database or with the content metadata. In some embodiments, the interface provides choices of actions for the user to select from (e.g., ask that the reusing party attributes it, offer license/licensing terms, remove under DMCA, etc.).

In some embodiments, 214 is not performed and the process continues at 216.

At 216, the user of the content is engaged. In some embodiments, user contact information is obtained from the IP address, the U.S. Copyright Office (e.g., a designated agent registered with the U.S. Copyright Office), or a known email address (e.g., of an OSP or a user of an OSP). A database or lookup table of contact information associated with various sites may be maintained and used to determine user contact information.

Depending on configuration settings, various types of communication may be sent to the content user. For example, a DMCA notice, information concerning usage rules, licensing information, etc. may be sent. For example, the content owner may have specified one or more usage rules associated with his content, such as "do not license any content," "replace content with an advertisement," "add watermark to content," "add Unicode overlay," "share advertisement revenue," or "ask permission prior to use." Based on the usage rules, an appropriate communication may be sent to the content user. In some embodiments, the content user is also configured to use the content monitoring system. The content user may have specified a set of compliance rules, such as "automatically debit my account up to $100 per year when licensed content is used," "offer to share advertising revenue when contacted by content owner," "remove content when contacted by content owner," etc. Based on the compliance rules, an appropriate response may be sent back to the content owner. In some embodiments, an engagement communication may be configured to be sent in a way that preserves the anonymity of the sender of the engagement communication (e.g., the content owner, or a content host, as more fully described below).

An example of an engagement communication includes an email that is automatically sent to a content user notifying the user that the content is owned and offering to license it for $9.99 per year, and including a link to the content owner's usage rules hosted by the content monitoring system. The content owner may configure his settings so that the email is not sent to content users whose sites are educational or non-profit or those settings may be default settings if the content owner's usage rules indicate free use by educational or non-profit sites. In response, the content user sends a response agreeing to the terms. The response may be created and/or sent automatically because the content user's compliance rules indicate the following rule: "automatically debit my account up to $100 per year when licensed content is used." The response may be sent manually, or the user may approve an automatically created response before it is sent.

In some embodiments, a series of communications may occur between the content user and content owner. On the content user and/or the content owner's side, the responses may be automatic. In this way, licensing terms can be negotiated and/or steps can be taken towards resolution.

In some embodiments, compensation is not necessarily monetary. For example, the content owner may just want to receive attribution, license revenue or advertising revenue sharing may be donated to charitable or other causes as directed by the content owner or may be treated as a credit towards a trade (e.g., if you use my content, I can use your content), or the content owner may require that the content and derivative works be presented in a manner that enables tracking of the number of uses or views of the content, or that derivative works must be available for use by others under specified usage rules.

In some embodiments, whenever new controlled content is provided, processes 202-206 are performed. In some embodiments, every prespecified search interval, processes 208-213 are performed. In some embodiments, every prespecified report interval, 214 is performed. For example, an email may be sent to the user indicating that new matches have been found, and a link to the web interface provided in the email message. In some embodiments, 214 is performed each time a user logs into the content monitoring system. In some embodiments, 208-213 are performed when a user logs into the content monitoring system, either automatically, or after a user selects an "update results" or "search" button upon logging in.

In some embodiments, the number of accesses to a controlled content object is tracked. For example, the content is associated with a web beacon or other element of code that enables the tracking of accesses of the content for purposes such as calculation of license fees or revenue sharing.

Figure 2B:
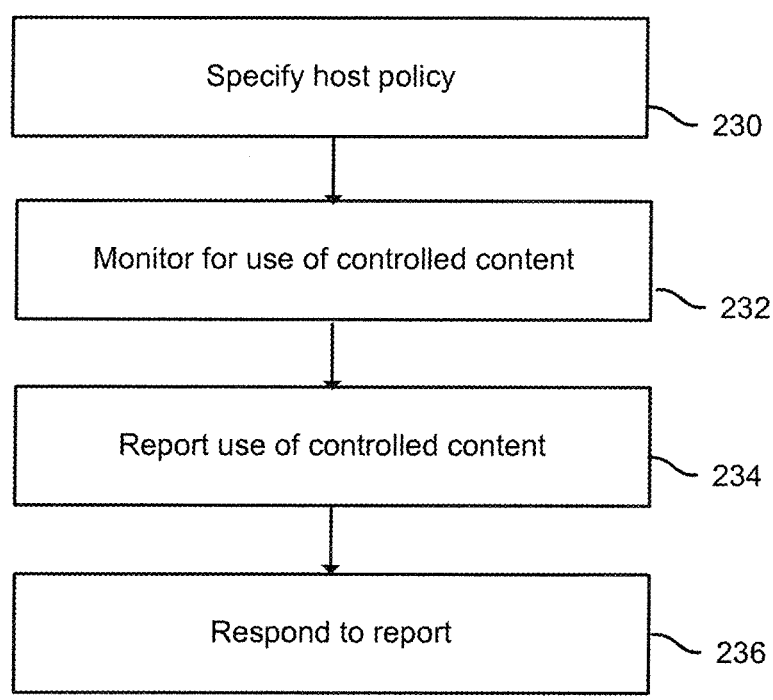
FIG. 2B is a flow chart illustrating an embodiment of a process for monitoring for use of controlled content.

FIG. 2B is a flow chart illustrating an embodiment of a process for monitoring for use of controlled content. In some embodiments, this process is performed when a content host, such as an OSP, is searching or monitoring for non-compliant use of content based on a host policy of the content host. Thus, the controlled content in this case is non-compliant content based on a host policy. In some embodiments, this process is performed by content monitoring system 100.

At 230, a host policy is specified. For example, an OSP may have a policy regarding what comprises non-compliant content. Non-compliant content may include material that violates third party copyrights or trademarks, is illegal (e.g., child pornography) or does not comply with an OSP's terms of service (e.g., adult content, pornography, obscenity). A host policy may include host rules that may be associated with any compliance structure, such as host specific compliance rules, rules against objectionable content (e.g., obscenity, adult content, child pornography), or any legal or personal compliance structure. A host policy may specify that content must comply with usage rules specified by the content owner, such as "copy left," "share alike," Creative Commons specified structures, etc.

A variety of user interfaces may be used to specify a host policy. For example, any of the user interfaces described at 203 for specifying usage rules may be used to specify a host policy. For example, a list of terms, checkboxes (to apply a rule), and settings (specific to a rule) may be provided. The list may include, for example: whether pornography is allowed, whether profanity is allowed, whether to comply with one or more usage rules, whether to comply with copyright or other legal structures, etc. The rules may be hierarchical. For example, a list of higher level rules or compliance structures may be displayed for selection, each of which may be expanded to display lower level rules that each of the high level rules comprises. Rules may have any number of levels. Checkboxes (or another appropriate object) may be located next to the higher level or lower level rules and may be selected (e.g., checked off) at any level of granularity.

At 232, content is monitored for use of controlled content. In this case, the monitored content comprises the content hosted by the content host (e.g., the content served by the OSP). In some embodiments, monitoring comprises checking each content object before it is hosted (or served) by the OSP. For example, an OSP such as YOUTUBE LLC may check each video before it is made available for viewing on YOUTUBE.COM. In some embodiments, monitoring comprises periodically checking content objects served by the OSP. For example, a new video is made available for viewing immediately after being posted, but the video may later be removed by a monitoring process that checks new content objects. If the video is determined to be non-compliant, it is removed and the video owner is optionally notified. The results of the check are stored in a database so that the video does not need to be checked again unless it is modified.

In some embodiments, if information obtained from the database is not enough to determine whether the content is compliant, an evaluation is performed, where the evaluation can include techniques described at 212. The evaluation may also include techniques used to detect objects or characteristics of objects in an image, such as faces, body parts, the age of a person being depicted, etc. Such techniques may be useful to detect pornography or child pornography, for example. The evaluation results may then be stored in the database.

Examples of monitoring are more fully described below with respect to FIG. 2D.

In some embodiments, a common pool of objectionable content is maintained based on input from multiple content hosts. For example, the common pool may include content that has been identified by various content hosts as containing pornography, child pornography, profanity, or racial content. Depending on the compliance rules specified in their host policies, an OSP may have an interest in contributing to, sharing, and using the common pool to identify objectionable content and remove or reject it.

For example, an OSP such as EBAY, Inc., may desire to monitor content posted by its users. An EBAY employee manually performs simple filtering for adult content. Each time the EBAY employee flags an object as "adult content," that object is acquired by the content monitoring system and becomes part of a common pool of objectionable controlled content.

Content in the objectionable database may also be stored with a certainty rating. For example, the greater number of times the content object has been identified as violating a rule, the greater the certainty rating. In some embodiments, for each content object in the objectionable database, data is maintained regarding each usage/compliance rule that it violates. For example, content object 10034 may be non-compliant with rules 4, 7, and 112, but not other rules. This information may be stored in a table, metadata associated with content object 10034, or in any other appropriate way.

In some embodiments, if the content is being monitored for by a user at 202-213, data from that process may be re-used at 232. For example, similarity, compliance, and other factors may be determined based on data already obtained at 202-213. Additional compliance factors that take into account the host policy may also be determined and used.

At 234, content is reported. In some embodiments, which content to report is configurable and may depend on criteria based on technical factors (e.g., similarity scores), compliance factors (e.g., non-compliance scores), and/or other factors (e.g., reputation information) as described at 214. Content reported may include content determined to be non-compliant based on the host policy. Content reported may also include notices received from content owners who believe the content host is using their content in a non-compliant way.

For example, a web interface may be provided for viewing and managing reported content. In some embodiments, the web interface allows the host to track and manage past and/or pending engagement notices. The web interface includes information about matching content, reputation information, similarity scores, non-compliance scores, link (s) to usage rules associated with the content object, and any other appropriate information. Reputation information could be related to the content owner, e.g., how reputable the content owner is. For example, the content owner may not actually be the content owner, but a scam artist or spammer who has sent thousands of notices. On the other hand, a reputable content owner may have only sent 3 notices in the past year. In some embodiments, reputation is based on ratings by other content users, content hosts, and/or other users of the content monitoring system. For example, content users who have dealt with a particular content owner and felt that he was legitimate may have given him good reputation ratings. In some embodiments, APIs to the content monitoring system are provided to the OSP for managing notices and responding.

At 236, the report is responded to. In some embodiments, an automatic response is sent according to rules set by the OSP. For example, whenever the OSP receives a DMCA notice from a content owner with a reputation rating above a specified value, it automatically takes down the image. In another example, whenever a child pornography match is made with a similarity score above 90 and a non-compliance score above 80, an email is sent to the user and if no response is received within a set period of time, the content is removed. In some embodiments, an OSP administrator manually reviews each content match and selects a response for each content match.

Besides a common pool of objectionable content, various common/collaborative pools of data may be maintained. Other examples of common pools of data include reputation of content owners, reputation of content users, reputation of content hosts, content known to be in the public domain, sites known to copy the most often, etc. These common pools may be contributed to by content owners (e.g., end users), content hosts (e.g., an employee on an OSP's content review team), legal experts, experts in "fair use," other reputable entities, results from previous detection results (e.g., false positives), etc. APIs or other interfaces may be provided to assist with flagging content for inclusion in these pools. These common pools of data may then be accessed and used during the monitoring process (e.g., during 202-216 or 231-232).

For example, a negation database be maintained that includes content that is known to be in the public domain, content that has expired or lapsed in copyright, and/or content that is difficult to claim ownership of, e.g., because it is common, such as disclaimers and copyright notices. Any content in the negation database is designated as compliant.

Figure 2C:
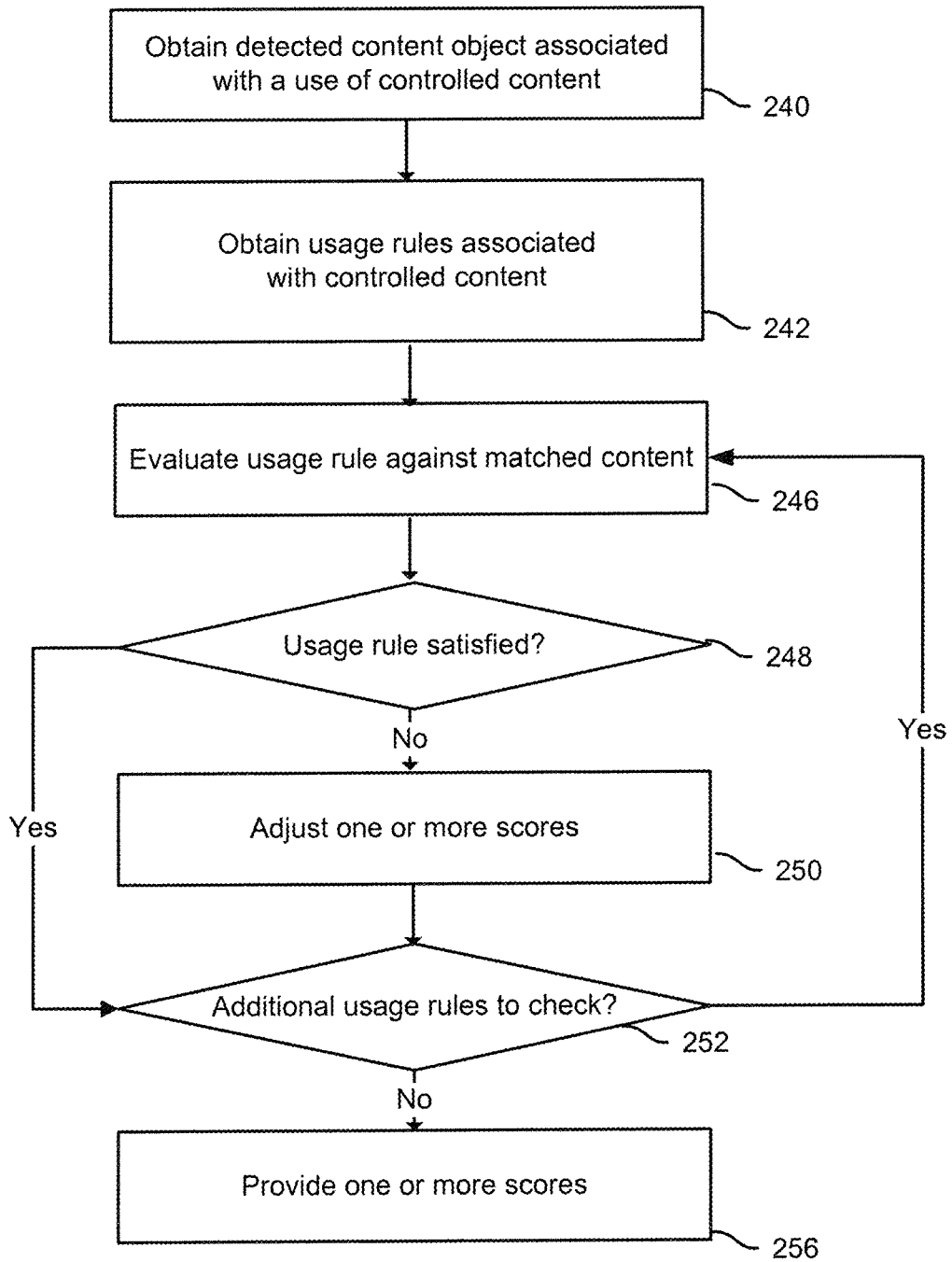
FIG. 2C is a flow chart illustrating an embodiment of a process for evaluating context of a content object.

FIG. 2C is a flow chart illustrating an embodiment of a process for evaluating context of a content object. In some embodiments, this process is used to perform 212 when the context includes compliance information (e.g., compliance factors). Examples of compliance factors include the presence or absence of advertising on a page containing the content object, whether the page contains paid content, etc. In some embodiments, this process is performed by content monitoring system 100. In some embodiments, this process is performed when a content owner is monitoring for use of his content.

At 240, a detected content object associated with use of controlled content is obtained. In some embodiments, the detected content object is detected based on technical factors, as described at 210.

At 242, usage rules associated with the controlled content are obtained. In some embodiments, the usage rules specified by the content owner at 203 are obtained.

At 246, a usage rule is evaluated against the detected content object. The usage rule may be specified at a high level (e.g., do not permit use on for profit sites, permit use on nonprofit sites) or at lower level (e.g., do not permit use on pages containing advertising, offer to license on pages containing paid content, permit use on sites ending with .edu). For example, it is determined whether the page associated with the content object contains advertising, requires a subscription, contains affiliate links, or contains paid content.

At 248, it is determined whether the usage rule is satisfied. If not, one or more scores are adjusted. For example, a non-compliance score may be increased or decreased as appropriate. At 252, it is determined whether there are additional rules to check. If there are additional rules to check, the process returns to 246. If there are no additional rules to check, one or more scores are provided.

Figure 2D:
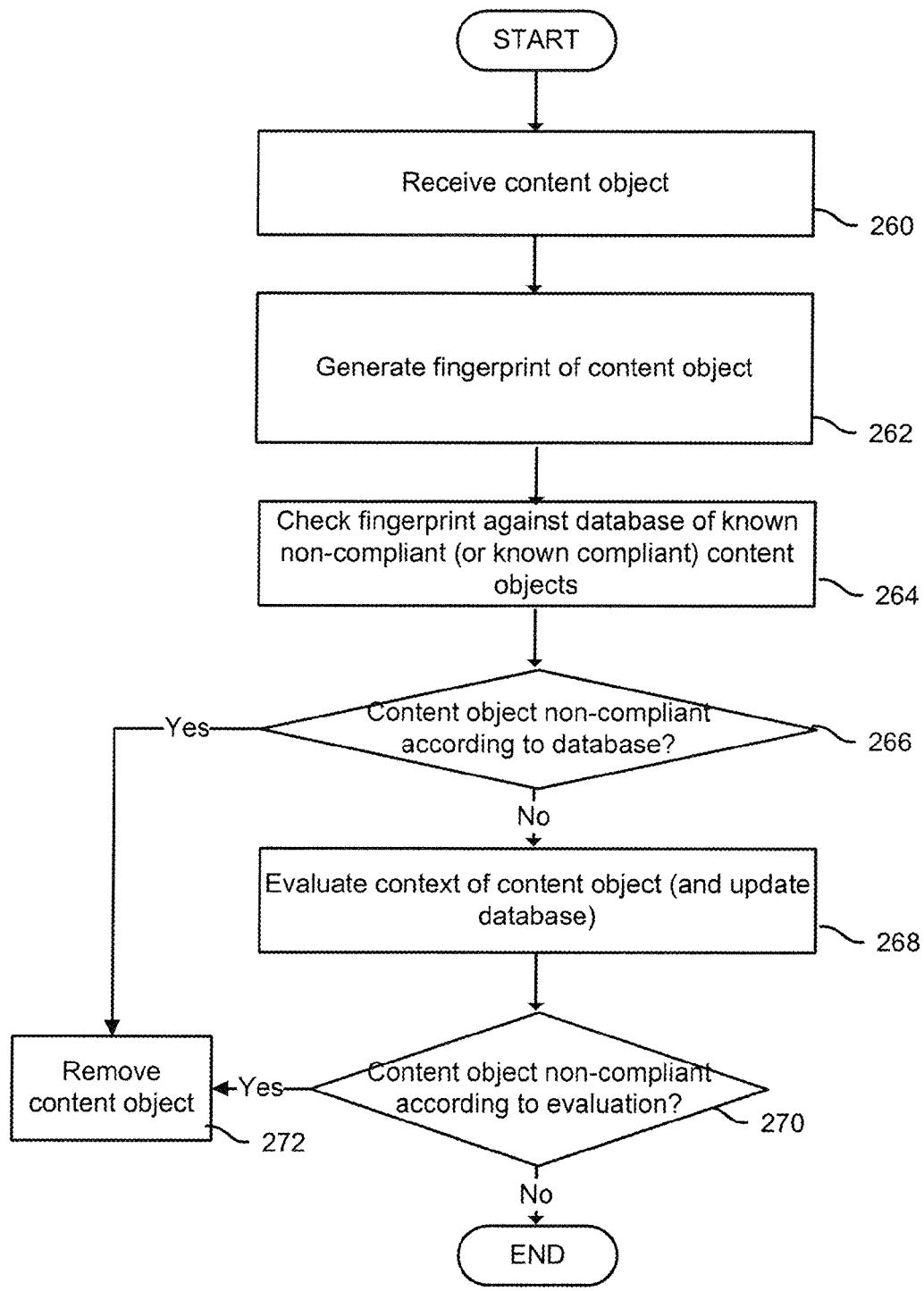
FIG. 2D is a flow chart illustrating an embodiment of a process for monitoring for use of controlled content.

FIG. 2D is a flow chart illustrating an embodiment of a process for monitoring for use of controlled content. In some embodiments, this process is performed by content monitoring system 100. In some embodiments, this process is performed when a content host, such as an OSP, is checking for non-compliant use of controlled content. For example, this process may be used to perform 232.

At 260, a content object is received. For example, a user is posting a new content object to an OSP site, and the OSP is receiving the content object for the first time. At 262, a fingerprint of the content object is generated. A fingerprint may be generated, feature(s) may be extracted, or other analysis performed, as described at 206. At 264, the fingerprint (or another analysis result) is checked against a database of known non-compliant (or known compliant) content objects. In some embodiments, the database includes a common pool of content that has previously been identified either manually or automatically as non-compliant or compliant. The content can be looked up by fingerprint or any other appropriate index. At 266, it is determined whether the content object is non-compliant according to the database. If it is non-compliant according to the database, the content object is removed at 272. If it is not non-compliant according to the database, then the content object is evaluated at 268. (In some embodiments, if the content is compliant according to the database, then the content object is approved for posting.) Evaluating may include any of the processes described at 212-213 and/or at 240-256. In some embodiments, evaluating includes notifying the content host (e.g., the OSP) and receiving an evaluation of the content object from the content host. For example, the content host may perform a manual or automatic evaluation. The results of or data from the evaluation is stored in the database with the fingerprint. At 270, it is determined whether the content object is non-compliant according to the evaluation. For example, the determination can be made based on technical factors, compliance factors, or other factors, as previously described. If the content object is non-compliant, the content object is removed at 272. If not, the process ends. In some embodiments, if the content object is not non-compliant, then the content object is approved for posting.

Figure 2E:
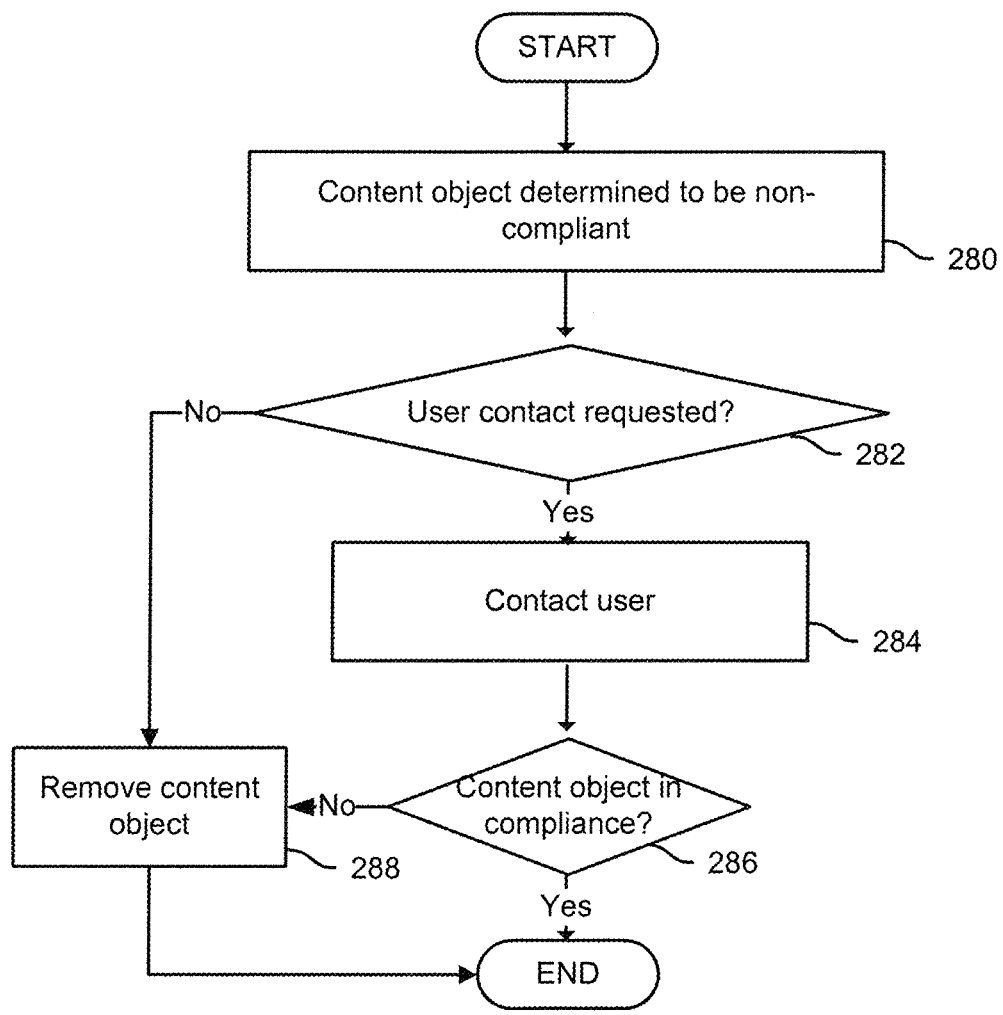
FIG. 2E is a flow chart illustrating an embodiment of a process for engaging with a user of non-compliant content.

FIG. 2E is a flow chart illustrating an embodiment of a process for engaging with a user of non-compliant content. In this example, rather than automatically removing a non-compliant content object, the user may be contacted first. In some embodiments, this process is performed by content monitoring system 100. In some embodiments, this process is used to perform 236 when non-compliant content is found. For example, this process may be performed in place of 272. At 280, a content object is determined to be non-compliant. For example, the determination can be made based on technical factors, compliance factors, or other factors, as previously described. At 282, it is determined whether user contact is requested, which may be a configurable setting. In this example, the user refers to the entity that posted the content on the OSP. If user contact is not requested, then the content object is removed. If user contact is requested, then the user is contacted at 284. For example, the user is notified that the user's content has been identified as non-compliant content and to either take down the content, explain why the content is compliant, or cause the content to be compliant (e.g., based on usage rules for the content). At 286, it is determined whether the content object is in compliance. For example, the user is given a set amount of time to respond, and after that time, an evaluation of whether the content object is in compliance is performed. If it is still not in compliance, the content object is removed. In some embodiments, if it is still not in compliance, the user is notified again, or another appropriate action is taken. If the content object is in compliance, the process ends. In some embodiments, if the content object is now in compliance a database is updated to include this information.

Figure 2F:
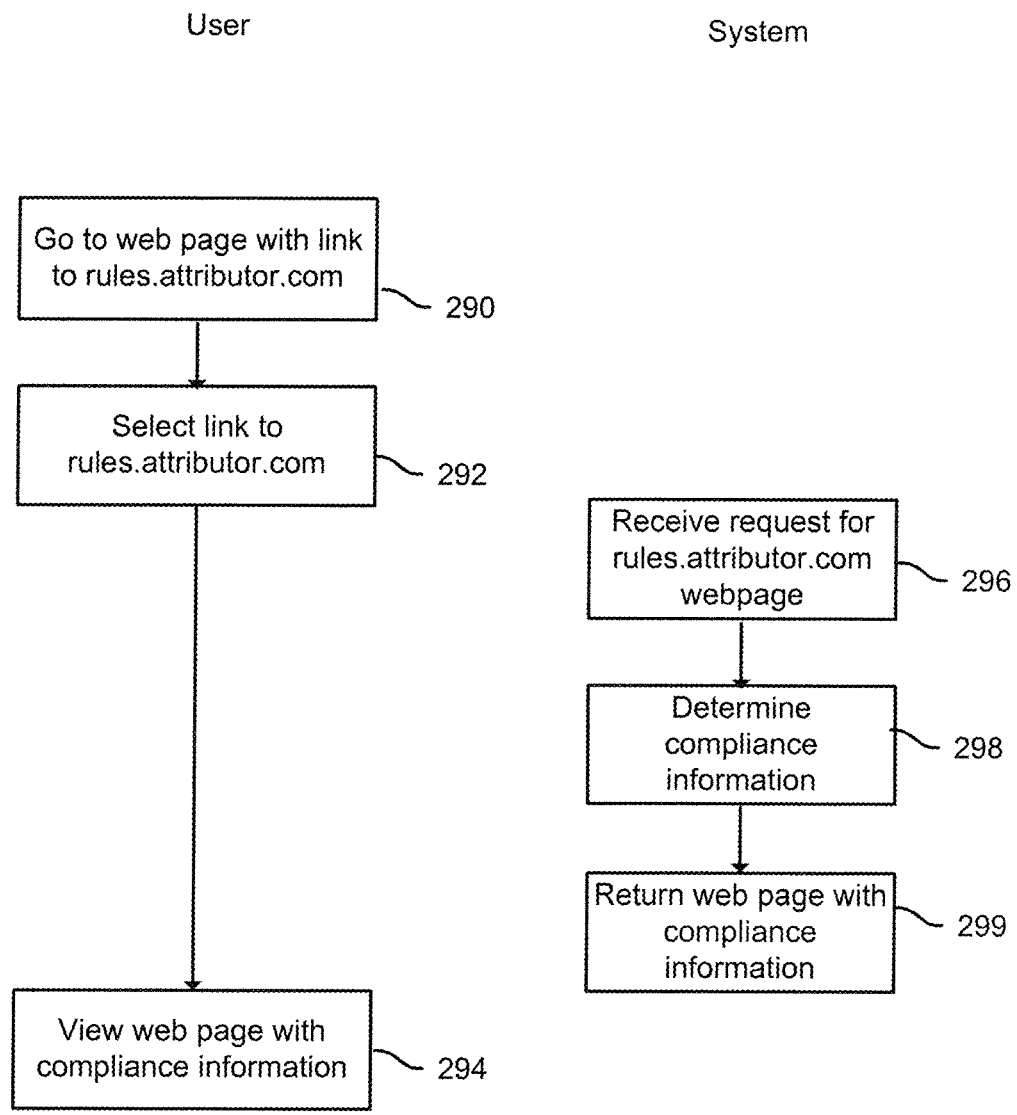
FIG. 2F is a flow chart illustrating an embodiment of a process for displaying compliance information.

FIG. 2F is a flow chart illustrating an embodiment of a process for displaying compliance information (e.g., rules) to a content user wishing to use content on a content owner's website (as described at 203). In this example, a content owner has created a web page of his content (e.g., "www.example.com") and included on the web page a link that is associated with a server that stores compliance information associated with his content. In some embodiments, the link is a common URL, where the common URL is not unique to the content owner or his web page (e.g., "rules.attributor.com"). At 290, the web page is viewed, e.g., by a potential content user. At 292, the "rules.attributor.com" link is selected. For example, the content user is interested in using the content, and would like to know if there are any usage rules associated with it.

A receiving system (e.g., a server that stores or has access to the compliance information) receives the request for "rules.attributor.com" at 296 and determines the appropriate compliance information at 298. In some embodiments, the compliance information is determined by looking up the web page from which the link was selected (e.g., the content owner's web page) in a table (or other appropriate structure) of compliance information. For example, next to "www.example.com" in the table are usage rules associated with content on "www.example.com." In some embodiments, the table includes information about content objects on the web page and associated usage rules. In some embodiments, the server retrieves the content on web page "www.example.com" and looks up associated compliance information based on the retrieved content information. For example, each content object may have a content object ID or fingerprint that may be used to identify it and look up usage rules associated with it. In some embodiments, both the URL "www.example.com" and information associated with the content object (such as a content object ID) are used to obtain the compliance information.

At 299, a web page with the compliance information is returned. At 294, the web page with the compliance information is viewed. For example, the potential content user views the compliance information and can decide whether to use the content.

Figure 3:
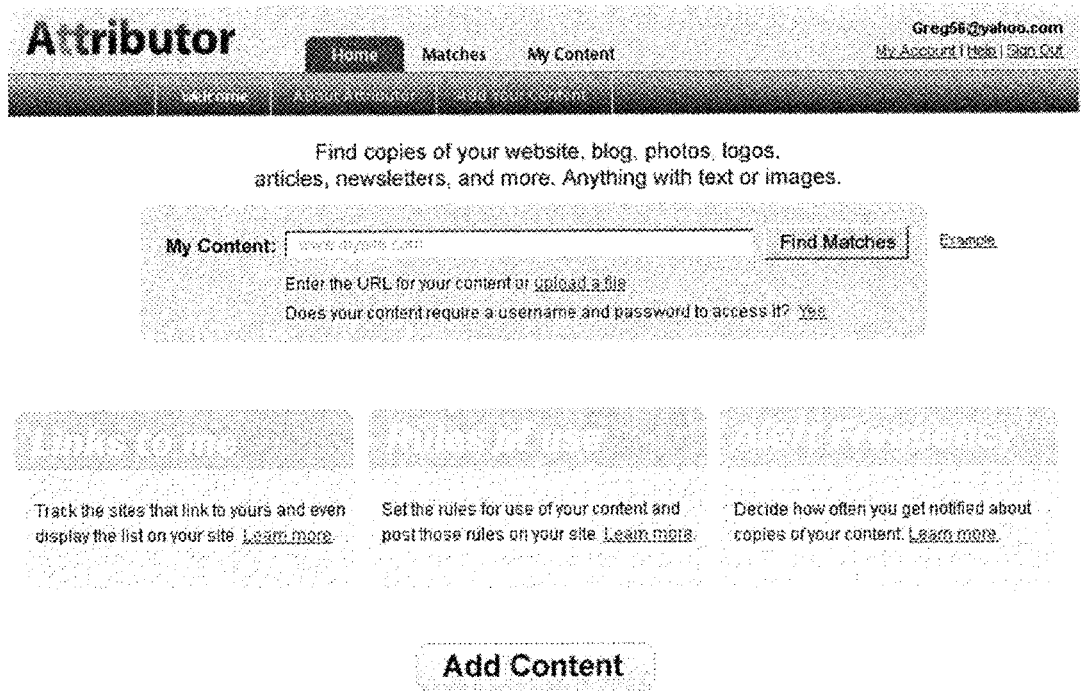
FIG. 3 is an example of a graphical user interface (GUI) for providing controlled content.

FIG. 3 is an example of a graphical user interface (GUI) for providing controlled content. In some embodiments, a user uses GUI 300 to specify content to be monitored at 202. As shown, a user can enter a URL or a link to controlled content or upload a file. Any number of content objects can be specified. A username and password to access content can be provided. In some embodiments, a user uses GUI 300 to specify input to ingestor 104 in FIG. 1.

GUI 300 and the other GUIs described herein may vary depending on the embodiment. Which functionality to include and how to present the functionality may vary. For example, which objects (e.g., text, links, input boxes, buttons, etc.) to include and where to place the objects may vary depending on the implementation.

FIG. 4A is an example of a GUI for providing controlled content. In some embodiments, GUI 400 opens in response to selecting a link in GUI 300, such as the "Add Content" button. In some embodiments, a user uses GUI 400 to specify content to be monitored at 202. In some embodiments, a user uses GUI 400 to specify input to ingestor 104 in FIG. 1.

As shown, one or more files may be provided in the "My content" input box. A user can indicate whether the content is a single web page or file or a URL or feed. In the case of the URL or feed, the content includes all existing content plus any new content added in the future. In the "Nickname" input box, the user can specify a nickname for the controlled content. In this way, a user can manage or maintain multiple sets of controlled content using different nicknames.

In some embodiments, a "Sites to watch" input box is provided, in which the user may enter URLs where the user expects the content to appear. For example, the user may currently be aware that a particular site is using the user's content. In some embodiments, the content monitoring system searches the web, but searches the specified sites first or more frequently.

In some embodiments, a "Related Keywords" input box is shown, in which, the user may enter keywords associated with the specified controlled content. For example, if the user expects the content to be found primarily in children's websites, the keywords "kids" and "children" might be included. In some embodiments, the content monitoring system automatically determines keywords (such as unique phrases) to search in addition to the related keywords specified by the user.

In some embodiment, a "Search Scope" input box, is shown, in which the user may specify whether the entire Internet should be searched or only domains specified by the user. In some embodiments, the user may specify to only search sites that copy the most often.

In some embodiments, a "Text" input box is provided, in which text may be entered. The text may be text in the content itself or text associated with the content, such as keywords, tags, depictions of the text (e.g., a photo of a street sign with text), etc. In addition, other search criteria may be specified, including a minimum similarity score, a minimum non-compliance score, a minimum percent of controlled content copied, a minimum percent of text copied, a minimum number of images copied, a minimum percent of match, whether the content is attributed (e.g., to the content owner), whether there is advertising on the page and what type, the minimum number of unique visitors per month, and what types of matches to find (e.g., images only, text only, video only, or combinations, etc.)

FIG. 4B is an example of a GUI for providing usage rules. In some embodiments, GUI 402 is included as part of GUI 400. In some embodiments, GUI 402 opens in response to selecting a link in GUI 400, such as a "Specify Rules of Use" link (not shown in GUI 400). In some embodiments, a user uses GUI 402 to specify usage rules associated with the content specified in GUI 400. In some embodiments, a user uses GUI 402 to specify usage rules at 203.

As shown, a list of usage rules may be selected by selecting bullets and checkboxes. The rules listed in this example include: attribution required/not required; commercial use OK, OK if user shares a specified percentage of the revenue, or no commercial use; limit text copies to a specified percentage of the source (controlled) content; no changes may be made to controlled content; contact content owner first for permission; share alike; a specified Creative Commons license; all rights reserved; or public domain.

Graphical icons are displayed next to each usage rule. For example, "$%" indicates that commercial use is okay if the user shares a specified percentage of the revenue. "By" with a slash through it indicates that attribution is not required. "%" indicates that text copied must be limited to a specified percentage of the controlled content.

A similar GUI may be used to specify host rules for a host policy.

FIG. 5 is an example of a GUI for displaying search results. In some embodiments, GUI 500 is used to report search results at 214, e.g., to a content owner. In some embodiments, reporter 110 in FIG. 1 reports results using GUI 500.

In the example shown, a content owner owns a collection of photography related content, including images of cameras and text descriptions of cameras. The search results are shown in a grid based layout. In each grid cell, a controlled content object and a match content object are shown, where it has been determined that the match content object is similar to the controlled content object based on a similarity score and a non-compliance score. As shown, in grid cell 502, the controlled image (camera1) and the match image (camera2) have a similarity score of 98 and a non-compliance score of 88. In some embodiments, data displayed includes one or more of the following: similarity score, non-compliance score, URL of the match content object, percent of the controlled object copied, percent of the controlled text copied, the number of controlled images copied, the date found, whether there is advertising on the page, etc. In the case of text, a portion of the copied text is displayed along with the controlled text in grid cell 504.

In some embodiments, rather than or in addition to reporting a score, a binary flagging (e.g., "interesting" or not) is reported. For example, a score that aggregates similarity, non-compliance, and/or other factors into a combined/summary score may be displayed.

In some embodiments, if there is more than one matched content object, then the additional matched content objects are displayed using a 3D graphical effect indicating there are multiple pairs. Using forward and back arrows, the user can cycle through the various pairs. In some embodiments, the pairs are displayed in descending similarity score order.

Various other functionality may be provided in GUI 500. For example, the search results may be filtered and sorted in various ways using the "Showing" and "Sort by" pull down menus. Additional controlled content may be added in the "Controlled Content" input box, an email address may be entered for automatic notification (e.g., when more matches are found) in the "Email Address" input box, etc. Rather than use a grid based layout, other layouts may be used in other embodiments.

In the case of a content host monitoring for use of non-compliant content based on the host policy, an interface similar to interface 500 may be used to display resulting matches. For example, cell 502 may display a match with copyrighted content. Cell 504 may display a match with content associated with child pornography. For example, in place of text1 may be a known image that has been positively identified (either manually or automatically) as child pornography, and in place of text2 may be a new image that is being posted by a user to the content host. In this case, the known image in place of text1 may have been in a database of known non-compliant content, and the match determined as described at 264. In some cases, the new image is determined to be a match with child pornography based on an evaluation (e.g., 268) rather than a match with a content object in a database of known pornography. In this case, in place of text1, there may be no image displayed, or data related to the evaluation may be displayed instead.

Figure 6:
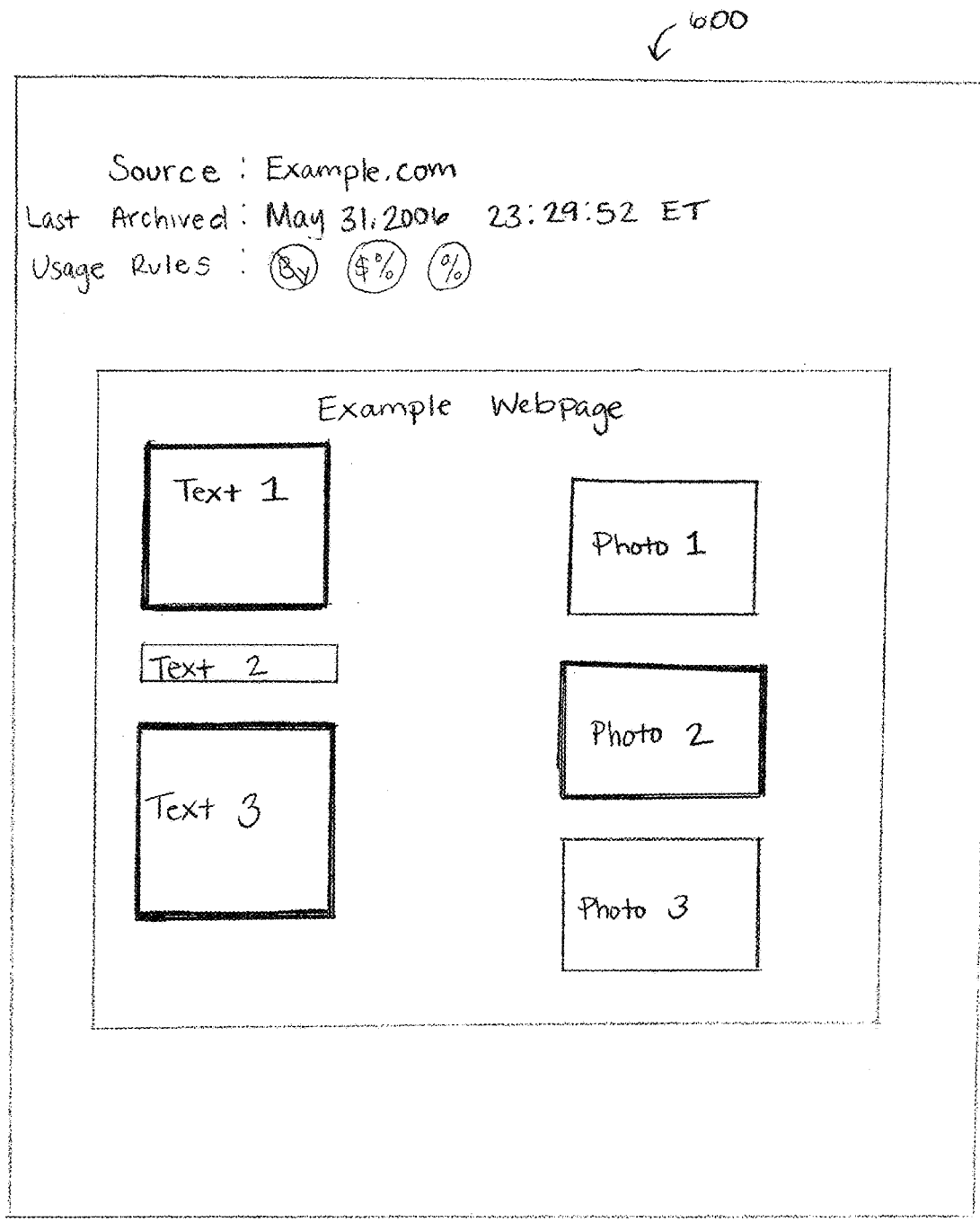
FIG. 6 is an example of a GUI for displaying use of a content object.

FIG. 6 is an example of a GUI for displaying use of a content object. In some embodiments, GUI 600 is displayed in response to selecting a "Match" link or the image or text corresponding to a match object in GUI 500.

In the example shown, the portions of the web page that include use of the controlled content are marked, i.e., boxed (e.g., a graphical box around the image or text that is being used). In this example, text1, text3, and photo2 are controlled content objects that are being used on this web page. In various embodiments, various indicators (e.g., visual cues) may be used to indicate the copied portions. Examples of indicators include: highlighting text, changing font appearance (e.g., using bold, underline, different fonts or font sizes, etc.), using different colors, displaying icons or other graphics in the vicinity of the copied portions, using time dependent indicators, such as causing the copied portions to flash, etc.

Various options or functionality may be provided for displaying information related to the use of the controlled content. For example, an archive date (May 31, 2006) may be displayed. Applicable usage rule(s) specified by the content owner may be displayed. In this case, the usage rules are displayed using the icons described with respect to FIG. 4B. When selecting an icon, details regarding the associated usage rule may be displayed.

In some embodiments, the web page shown is the current version of the web page. In some embodiments, the web page shown is an archived version. For example, the archived version may be stored in monitored content store 118. Whether the web page is the current version or an archived version may be indicated in the GUI. In addition, the user may be able to toggle between the two versions.

In some embodiments, a management GUI may be provided for managing content that provides links to one or more of the GUIs described above. In some embodiments, a user uses the management GUI to manage content, including add new controlled content, modify search parameters, report search results, etc. For example, various tabs may be provided, such as a "My Content" tab used to add/modify controlled content and search parameters and a "Matches" tab used to display search results. In some embodiments, selecting the "Matches" tab opens GUI 500.

A user can group content into categories, such as categories associated with the user's blog, camera reviews, the user's EBAY account, and all files. In various embodiments, content may be grouped in folders, by tags, or in any other appropriate way. A list of controlled content (e.g., URLs, paths) associated with the category may be displayed, including the number of content objects associated with the controlled content, when the content objects were last archived (e.g., placed in controlled content store 116), rules associated with each content object, and the number of matches found for the content object(s).

Determination of Originality

Figure 7:
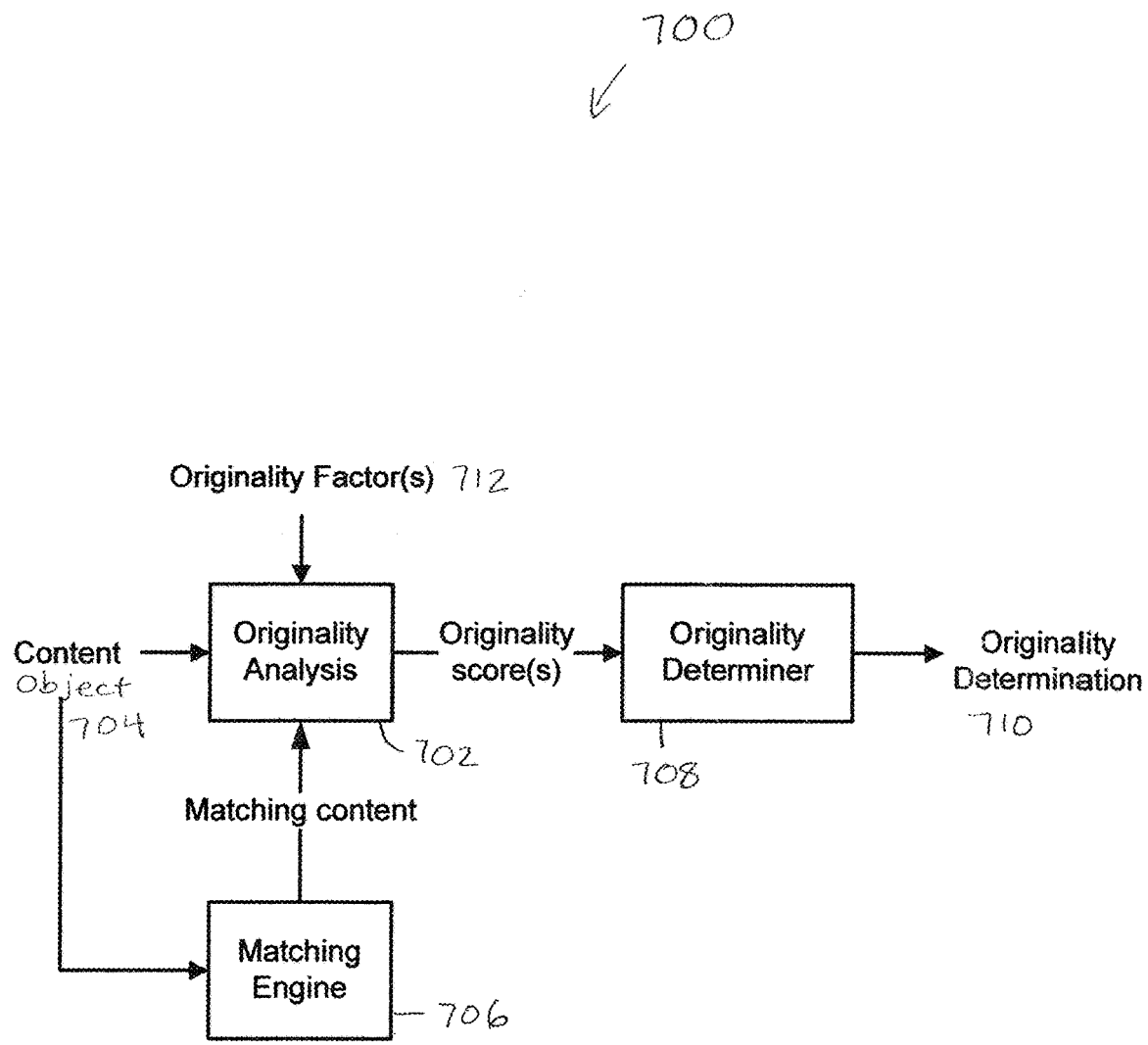
FIG. 7 is a block diagram illustrating an embodiment of a system for making a determination of originality of content.

FIG. 7 is a block diagram illustrating an embodiment of a system for making a determination of originality of content. System 700 provides a determination of originality for one or more content objects. In some embodiments, system 700 provides a determination of originality for all registered content objects. In some embodiments, system 700 provides a determination of originality for a content object in response to a request. For example, system 700 may be used in a content clearinghouse system. A determination of originality may be useful in a variety of applications, including the verification of originality for the purposes of determining the priority of listings in search and match results in search engines, licensing of the content, and participation of publishers in contextual advertising networks, as more fully described below.

As used herein, an original content object includes an instance of a content object that is available at a location (such as a URL) that is served by or on behalf of either the original author or creator of the content or by a party authorized to present the content. As such, there may be more than one "original" of any unique content object. In many but not all cases the "original" may appear at the location where the unique content object was first observed by any automated crawler. A derivative version of a content object may be non-identical to an original version of a content object.

In the examples described herein, for purposes of explanation, it may be assumed that there is only one original content object or one Deemed Original, as more fully described below. However, it should be understood that in many cases, there are multiple original content objects or Deemed Originals.

In the example shown, content object 704, originality factors 712, and matching content (if any) are provided as input to originality analysis block 702. In some embodiments, content object 704 is one of a plurality of content objects that is provided as input to originality analysis block 702. For example, a crawler such as crawler 112 (FIG. 1), may crawl the Internet to catalog which content is original (and which is not). In other embodiments, users designate content sources for capture and comparison.

In some embodiments, the matching content is provided by a matching engine 706, such as matching engine 120 (FIG. 1). The matching content is content that matches content object 704 based on criteria such as similarity scores and non-compliance scores, as described above. Depending on content object 704, there may or may not be matching content.

Originality analysis block 702 analyzes content object 704, originality factors 712, and matching content. Originality factors 712 include any factors that may affect the originality of the content object. Examples of originality factors 712 include: whether the originality of the content object has been challenged by another user, whether the claimed owner of the content object is registered or authenticated, and any third party verification of an originality factor—such as, where a third party content host presents the content with an indication that the user has a paid subscription to the hosting service, which may indicate that the user is not anonymous and therefore more likely to be the claimed rights holder. Besides originality factors 712, other originality factors may be analyzed. For example, other originality factors may be derived from content object 704 (or the matching content), such as whether content object 704 is a subset or superset of another content object and the presence or absence of attribution. Originality factors are described more fully below.

In some embodiments, originality analysis block 702 determines an originality score for content object 704 and each matching content object. Originality determiner 708 makes a determination of which of the content objects, if any, are original content objects. An originality determination 710 is provided as output. In some embodiments, if the content object is determined to be original, the content object is identified as a "Deemed Original". In some embodiments, none of the content objects are deemed original. Originality determination 710 may be made based on a variety of rules and do not necessarily result in the actual original content object. For example, in some cases, originality determiner 708 selects the content objects that are the most likely to be an original, e.g., based on one or more rules.

In some embodiments, "Deemed Original" status is published in a Usage Rules Summary associated with each registered content page, as a web service, available to third parties such as search engines, in a visible badge that may be coded by users into their registered content pages and feeds, on match results pages when the match query includes the registered content, and/or as part of publisher reputation information that is provided to hosts with remedy requests.

Content owners may benefit from Deemed Original status because "Deemed Original" status provides an originality verification for licensing and revenue sharing transactions involving the registered content. Presentation on match results pages allows potential content licensees to find rights holders more easily. Originality scores can be used for ranking search engine results, filtering search spam and claiming rights to contextual ad revenue, as described more fully below. Individual authors and creators may take pride in the distinction of having content that is a Deemed Original.

In some embodiments, for non-paying users, Deemed Original status for any content object is noted in appropriate parts of their interface. A user must subscribe (and become a paying user) to have their Deemed Original Status publicly available.

In some embodiments, upon initial designation of a content source for monitoring, the user is provided with a link to an inventory of all content objects that are Deemed Originals. This may provide an opportunity to communicate immediate benefits of subscription at the time of registration, even prior to identification of any actionable matches.

In some embodiments, a Source Detail Page includes visual cues (such as highlighting) to indicate Deemed Original content objects. This view also is publicly available from a Usage Rules Summary for the related page.

Figure 8:
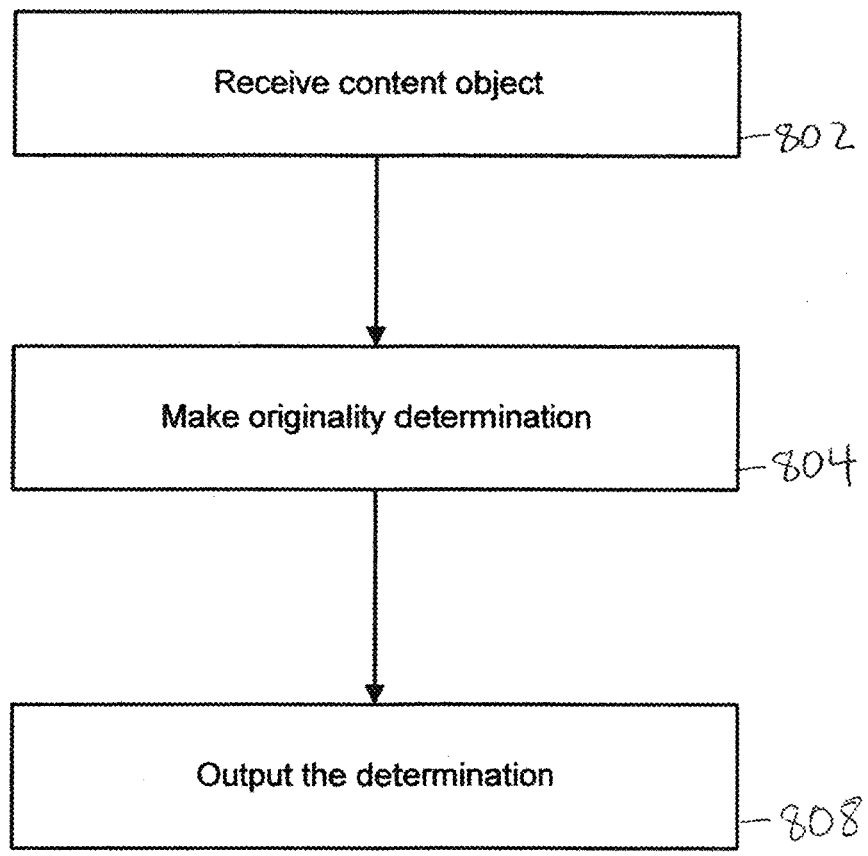
FIG. 8 is a flowchart illustrating an embodiment of a process for performing an originality determination.

FIG. 8 is a flowchart illustrating an embodiment of a process for performing an originality determination. This process may be implemented on system 700, for example. In the example shown, at 802, a content object is received. For example, a request for a determination of originality of a content object is received. The request may be made by a content owner, a content host, a content user, or a crawler. For example, the request may be made by a user who is interested in using the content object and would like to know who owns the content object. In another example, a content host may request a determination of originality so that it can provide a visual indication of originality when displaying a content object. For example, search engine results may display search results associated with original content objects above other search results.

At 804, an originality determination is made. Determining originality includes analyzing one or more originality factors related to the content object and determining automatically whether the content object is original based on the analysis of the originality factors. Examples of originality factors are more fully described below. At 808, the determination is output. In some embodiments, the determination is displayed in a user interface. The user interface may display a visual indication of whether the content object is a deemed original. In some embodiments, the originality score is displayed or accessible to the user. In some embodiments, the originality score is hidden from the user.

In some embodiments, the originality determination for a content object has already been made and is stored (e.g., as metadata for the content object, as described below). In this case, the determination is retrieved at 804.

Figure 9:
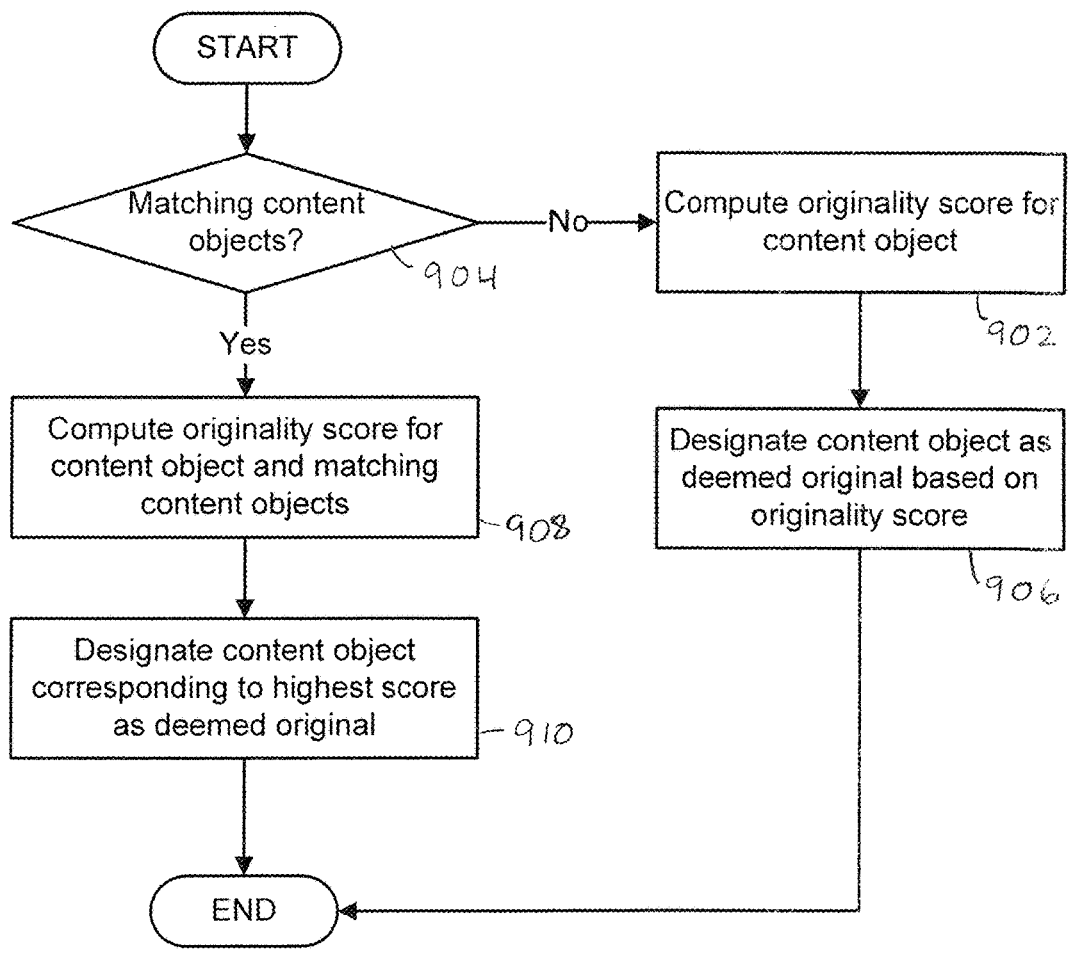
FIG. 9 is a flowchart illustrating an embodiment of a process for making an originality determination.

FIG. 9 is a flowchart illustrating an embodiment of a process for making an originality determination. This process may be implemented by system 700 and may be used to perform 804. In the example shown, at 904, it is determined whether there are any matching content objects. If it is determined that there are no matching content objects, then an originality score is computed for the content object at 902. At 906, the content object is designated as a deemed original based on the originality score for the content object. For example, a threshold may be specified such that if the originality score for the content object is above the threshold, the content object is designated as a deemed original.

If it is determined that there are matching content objects, then at 908, an originality score is computed for the content object and the matching content objects. At 910, the content object corresponding to the highest score (of the original and the matching content objects) is designated as a deemed original. In the case in which two or more content objects have matching or similar originality scores, in some embodiments, the content object corresponding to the earliest time of first appearance is selected. In some embodiments, rather than or in addition to outputting whether the content object is a deemed original, the originality score is outputted. As previously described, there may be more than one instance of an original content object. In some embodiments, if two or more content objects have matching or similar originality scores and/or are above a threshold, then these content objects are all Deemed Originals.

In some embodiments, the originality score is stored, for example, as metadata for the content object. In some embodiments, the originality score for all the content objects is stored, which may be desirable so that calculating the scores does not need to be repeated at a future time. In some embodiments, an indication of whether a content object is deemed original is stored. In some embodiments, the content objects that are not deemed original are deemed unoriginal, and this is stored. For example, a content object may be deemed original, deemed unoriginal, or not yet tested for originality.

Figure 10:
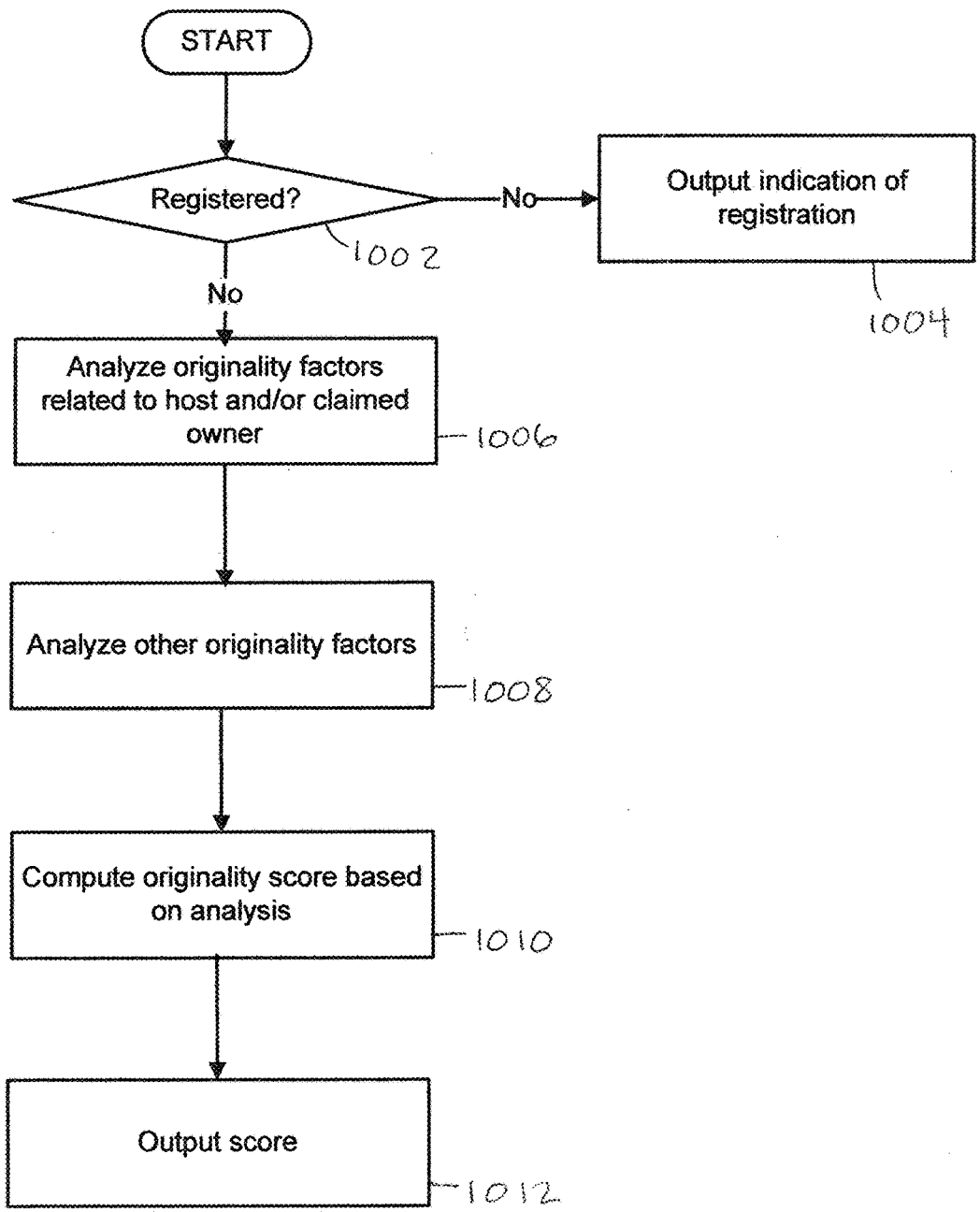
FIG. 10 is a flowchart illustrating an embodiment of a process for computing an originality score for a content object.

FIG. 10 is a flowchart illustrating an embodiment of a process for computing an originality score for a content object. In some embodiments, this process is used to perform 902 and/or 908. This process may be implemented on system 700. In the example shown, the process begins at 1002, at which it is determined whether the content object is registered. A content object may be registered by the owner of the content object. In this example, a content object must be a deemed original in order to be registered. Thus, if it is determined that the content object is registered at 1002, then at 1004, an indication of registration is outputted.

Otherwise, if it is determined that the content object is not registered, then at 1006, originality factors related to a host and/or claimed owner associated with the content object are analyzed.

If the content object is hosted, then originality factors related to the host may be analyzed. For example, if a user browsing the web comes across a content object hosted by a content host, the user may request that an originality determination be made of the content object. Originality factors related to the content host may then be analyzed, including, for example, whether the content host is registered or is legally bound, as more fully described below.

If the content object has a claimed owner, then the claimed owner may be analyzed. For example, a content owner may upload a content object and request to register the content object. Before the content object can be registered to the content owner, an originality determination is made of the content object. Originality factors related to the content owner may then be analyzed, including, for example, whether the content owner is registered or is legally bound, as more fully described below.

The content object may both have a claimed owner and be hosted. For example, a professional photographer's photo may be displayed on a news website at URL X. The photographer may then request to register the photo located at X. In response, an originality determination is made of the photo, including analyzing both the content owner (i.e., the photographer) and the content host (i.e., the news website). If, for example, the news website is registered and legally bound, then the content object would have a higher originality score.

Examples of analyzing originality factors related to a host and/or content owner are described below with respect to FIG. 11.

At 1008, other originality factors are analyzed. Other originality factors include, for example, historical information associated with the content object, attribution associated with the content object, and the quality of the content object. Examples of analyzing other originality factors are described below with respect to FIG. 12.

At 1010, an originality score is computed based on the analysis at 1006 and/or 1008. For example, if the claimed owner is registered, then the originality score is higher. If there is an attribution to the content object, then the originality score is higher. Further examples are provided below. At 1012, the score is outputted.

Figure 11:
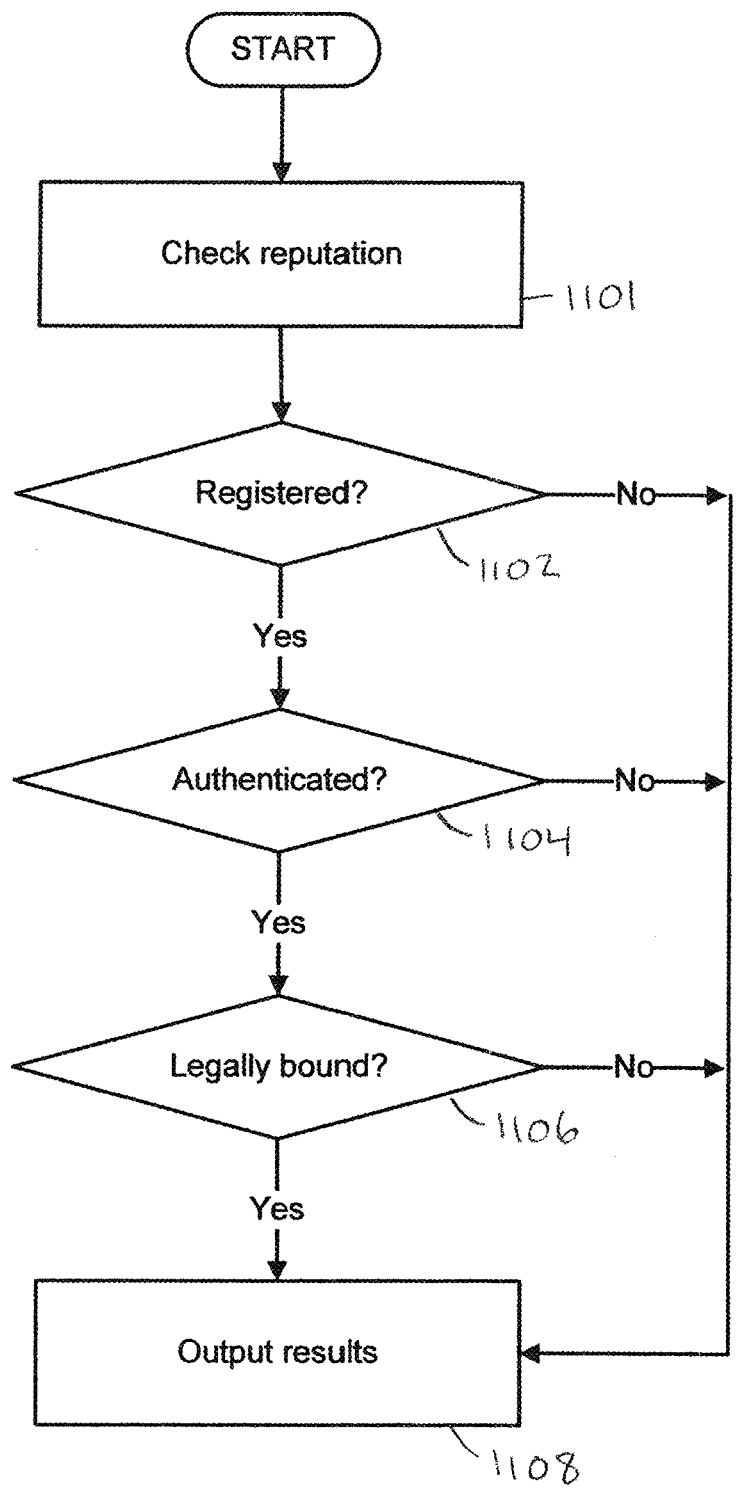
FIG. 11 is a flowchart illustrating an embodiment of a process for analyzing originality factors related to the host and/or claimed owner of a content object.

FIG. 11 is a flowchart illustrating an embodiment of a process for analyzing originality factors related to the host and/or claimed owner of a content object. For example, this process may be used to perform 1006. This process may be implemented by system 700.

In the example shown, the process begins at 1101, at which the reputation of the host or claimed owner is checked. In some embodiments, reputation is based on past behavior of a host or owner. For example, a host that always attributes content has a higher reputation than a host that does not attribute content. A content owner whose ownership is frequently challenged has a lower reputation than a content owner whose ownership has never been challenged. Reputation may be with respect to one or multiple systems. In some embodiments, a higher reputation corresponds to a higher originality score. Reputation is more fully described below with respect to FIG. 13.

At 1102, it is determined whether the host or claimed owner is registered. In some embodiments, content hosts are registered as hosts and content owners are registered as owners. In some embodiments, hosts and owners are registered as the same entity. In some embodiments, registration comprises providing identification (e.g., name, email address, residence address, social security number, credit card number, etc.). In some embodiments, the more identification provided, the higher the originality score.

In this example, the host or owner must be registered in order to be authenticated and must be authenticated in order to be legally bound. (Other embodiments may vary.) Therefore, if the host or owner is not registered, then the result that the host or owner is not registered is output at 1108. If the host or owner is registered, then it is determined whether the host or owner is authenticated at 1104. In some embodiments, authentication comprises verification of identification (e.g., verifying that a credit card number is valid). In some embodiments, the user is a paying subscriber, whose identity may be authenticated through a credit card transaction, identity verification service, direct enterprise contract, or other identify verification method.

If the host or owner is not authenticated, then the results (from 1102 and 1104) are output at 1108. If the host or owner is authenticated, then it is determined whether the host or owner is legally bound at 1106. In some embodiments, a host or owner is legally bound if the host or owner has agreed to comply with one or more legal requirements. For example, the user has agreed to specified obligations or penalties for ownership claims made in bad faith. The results (from 1102, 1104, and 1106) are output at 1108.

There may be inconsistent indication of originality of a content object, such as conflicting claims of ownership. For example, a content owner attempts to register a content object and during the originality determination process, it is found that another content owner has already registered the content object. In this case, the ownership of the content object may be challenged. In some embodiments, if there is a challenge to the claim for originality, then this may lower the originality score or be recorded separately (e.g., rather than designating a content object a Deemed Original, it may be deemed a Qualified Original).

Figure 12:
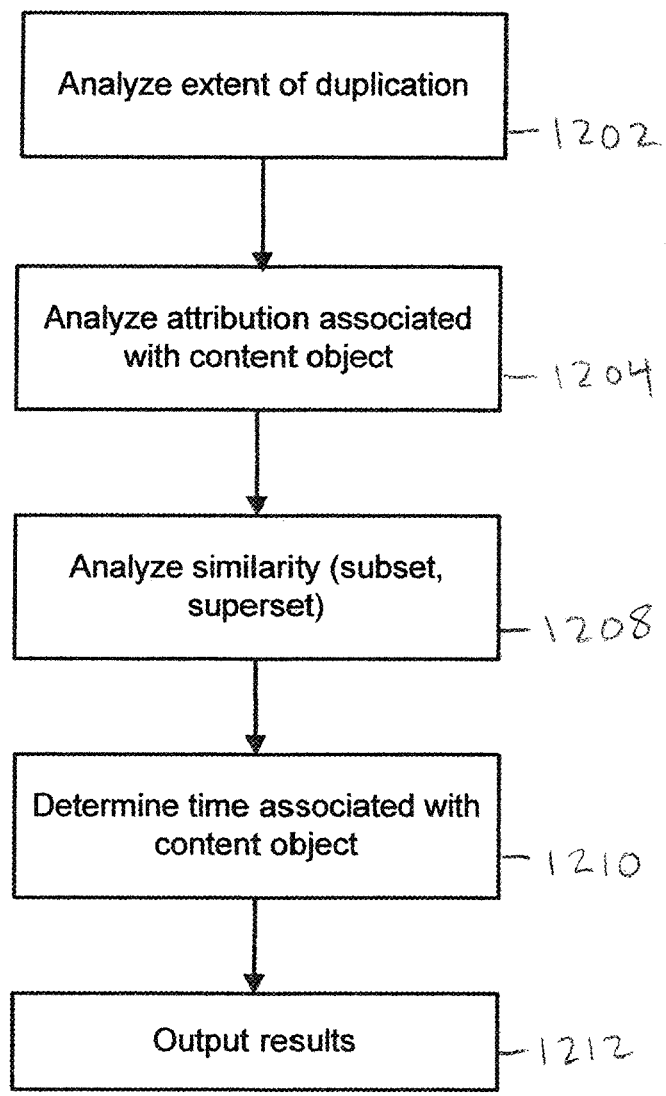
FIG. 12 is a flowchart illustrating an embodiment of a process for analyzing originality factors.

FIG. 12 is a flowchart illustrating an embodiment of a process for analyzing originality factors. For example, this process may be used to perform 1008. This process may be implemented by system 700.

In the example shown, the process begins at 1202, at which the extent of duplication is analyzed. For example, if it is determined that there are matching content objects, then the number of matching content objects is used to compute the originality score for the content object. In some embodiments, the greater the number of matching content objects, the lower the originality score. In some embodiments, the number of matching content objects is used in combination with other factors, such as the number of matches that provide attribution versus the number of matches overall; the number of matches that pre-date versus post-date the first known instance of the subject content; and the number of pre-dating matches that contain attribution from other third party parties.

At 1204, attribution associated with the content object is analyzed. Attribution may be direct or indirect attribution. An example of direct attribution is cnn.com attributing a news article to a media outlet, for example, by placing the name of the media outlet and/or a link to the media outlet's web location near the article. An example of indirect attribution is a blog attributing the news report to cnn.com. In some embodiments, the more direct or indirect attribution to a particular content object, the higher the originality score of the content object. Attribution may be determined using information extraction, natural language processing, and/or analysis of links (e.g., URLs).

At 1208, similarity to matches is analyzed, where similarity includes whether the content object is a subset of a match, a superset of a match, or identical to a match. For example, a content object may comprise one paragraph from a news article (subset) or a content object may comprise the news article plus additional content (superset). Percentages or other measures may be computed to quantify the similarity. In some embodiments, if the content object is a subset of a match, then the originality score is lower. If the content object is a superset of a match, then the originality score is higher.

At 1210, a time associated with the content object is determined. For example, the time could be a time or time stamp when the content object first appeared on a content host. In some embodiments, the time is obtained using the Internet Archive. In some embodiments, the earlier the time, the higher the originality score. In various embodiments, a time associated with the content, matching content, or attributing content is determined.

At 1212, the results (from 1202-1210) are output. This flowchart is an example of various originality factors that may be analyzed. In various embodiments, various other originality factors may be analyzed. For example, the quality of the content object may be analyzed. An example of quality is the resolution of an image. In some embodiments, the higher the quality of a content object, the higher the originality score.

Figure 13:
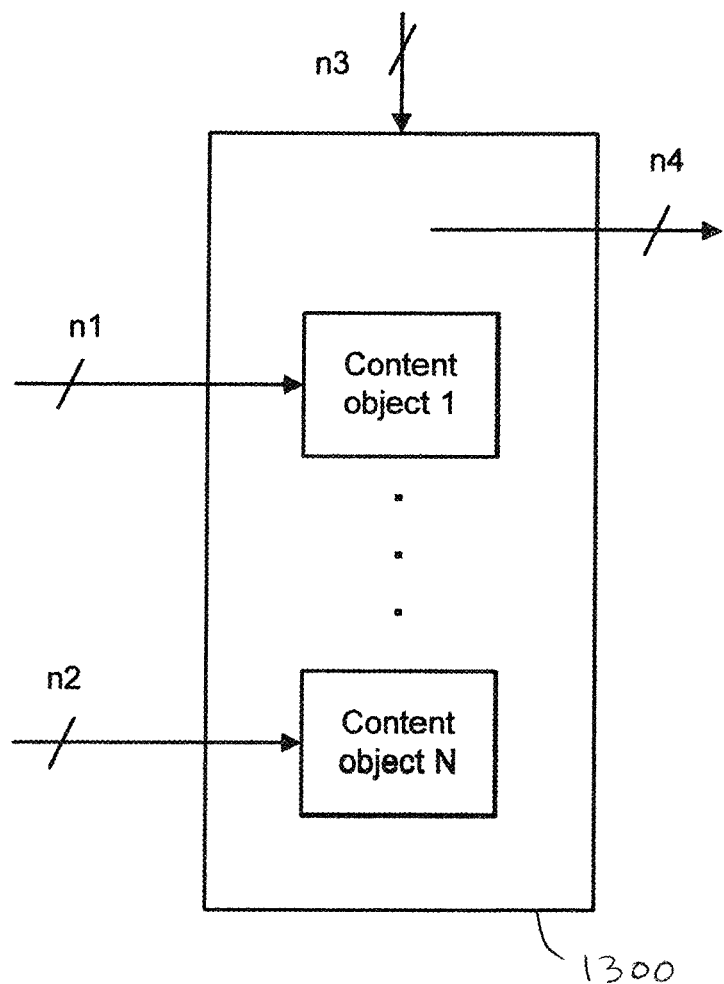
FIG. 13 is a block diagram illustrating an example of originality factors related to the reputation of a host.

FIG. 13 is a block diagram illustrating an example of originality factors related to the reputation of a host. For example, these factors may be analyzed at 1204. In the example shown, web location 1300 is hosted by a content host. A web location may include a web page, feed, or any other method of transmission. Web location 1300 includes content objects 1-N. n1 is the number of attributions to content object 1. Attributions may be in the form of text or links. n2 is the number of attributions to content object N. n3 is the number of attributions to web location 1300. n4 is the number of attributions from web location 1300 to other web locations, where the attributions are used to attribute content on web location 1300. In some embodiments, the greater n1, n2, n3, and/or n4, the greater the reputation of the host. Stated another way, if there are many attributions to web location(s) of a host (n3) or to content objects on web location(s) of a host (n1, n2), then the host's reputation goes up. Similarly, if there are many attributions from web location(s) of the host to other sources (n4), then the host's reputation goes up. In other words, a host that tends to attribute content has a good reputation. n1, n2, and n3 may include direct and/or indirect attribution. In some embodiments, direct attribution is weighted differently or more heavily. In some embodiments, since a content owner may be associated with a host, the content owner's reputation is based on the host's reputation and vice versa.

In some embodiments, reputation is based not just on the tendency to attribute content, but also the tendency to attribute content properly or consistently with instances of attribution to the same source provided by other properties. In other words, in some embodiments, improper attribution does not necessarily increase the positive weight of the reputation.

Other factors that may affect a host or owner's reputation is the number of times or frequency that ownership of content by the host or owner is challenged. In some embodiments, the fewer times the host or owner has not been challenged before, the higher its reputation.

In some embodiments, a challenge to a claim of ownership of content that has been designated as a "Deemed Original" changes its designation to a lower level of authentication (such as "Qualified Original")

In some embodiments, a web page or other collection of one or more content objects is given a designation to indicate that each of the content objects on the web page or in the collection is either: (1) original or (2) non-original and properly attributed.

Figure 14:
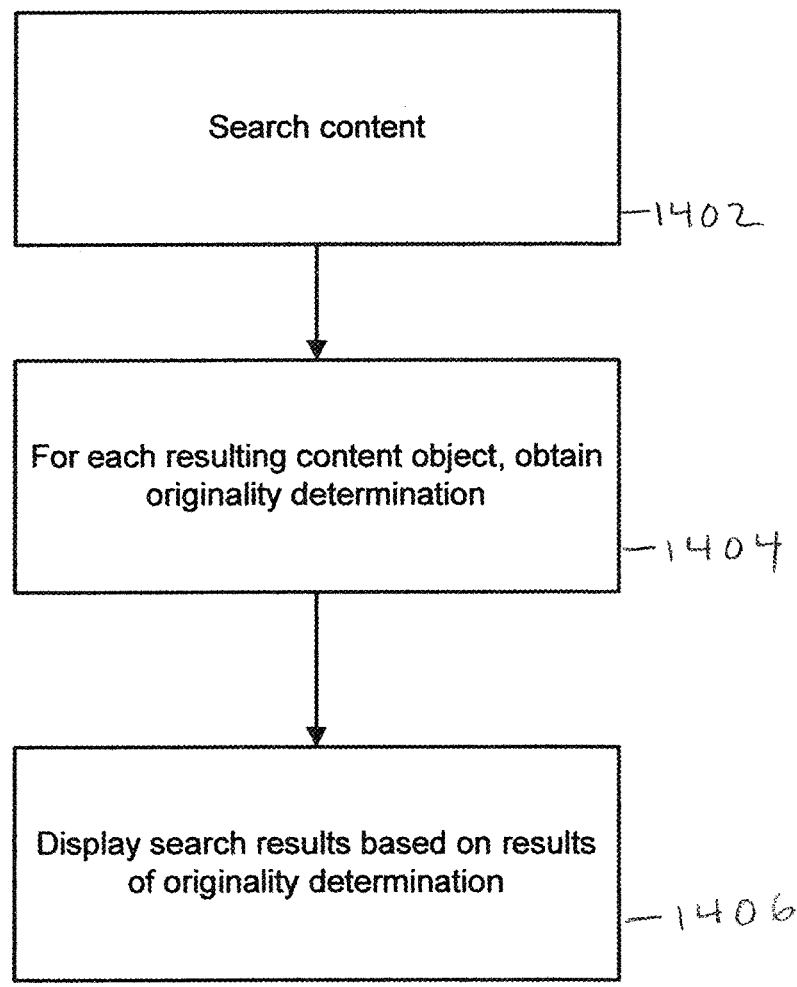
FIG. 14 is a flowchart illustrating an example usage of a system for determining originality.

FIG. 14 is a flowchart illustrating an example usage of a system for determining originality, such as system 700. In this example, a search engine displays search results based on the originality of the search results. For example, a search engine may use an API that returns originality determination results for content objects. In some embodiments, a search engine may perform the originality determination.

In the example shown, at 1402, content is searched. At 1404, for each resulting content object in the search results, an originality determination is obtained. For example, the process of FIG. 8 is performed for each content object. At 1406, the search results are displayed based on results of the originality determination. For example, the search results may be displayed in an order that takes into account the originality of content in the search results. Search results with original content would be displayed higher than search results with less original content (e.g., search spam). For example, search results could be sorted and displayed based at least in part on originality scores associated with content in the search results. Alternatively, search results with original or unoriginal content could be flagged or some other visual cue used. In some embodiments, matches of Deemed Originals or content objects with higher originality scores are treated as higher priority in sorting of match results (since they are potentially of more interest to searchers), and/or may be provided as a more advanced search sorting filter. In some embodiments, content is included or excluded from search results based at least in part on the originality determination.

In some embodiments, content is presented with an indication of originality, which indication reflects a query, which may be real-time, to a third-party system. In some embodiments, this originality determination accounts for the presence of non-original content which does not lower the originality score so long as the non-original content is properly attributed, for example to a third party source(s).

Originality determination information may be used in a plurality of other applications. In some embodiments, an advertising network uses the determination to ensure that advertising revenue or other benefit is paid only to authorized persons, or that advertising revenue or other benefit is paid in proper amounts to one or more authorized persons. For example, an advertising system (e.g., Google AdSense) may use originality determination information for screening purposes. In some embodiments, the advertising system does not provide advertising revenue to websites that do not provide original content. This prevents search spam sites from receiving advertising revenue.

Thus, in accordance with one aspect, the present technology comprises a system for making a determination of originality of content. Such system includes a processor configured to: analyze at least one originality factor related to the content (wherein the originality factor is independent of a time when the content is detected); based on the analysis of the at least one originality factor, automatically make the determination; and output the determination. The system further includes a memory coupled with the processor, where the memory provides the processor with instructions.

In another aspect, the present technology comprises a computer program product for making a determination of originality of content. Such computer program product is embodied in a computer readable medium and comprises computer instructions for: analyzing at least one originality factor related to the content (wherein the originality factor is independent of a time when the content is detected); based on the analysis of the at least one originality factor, automatically making the determination; and outputting the determination Challenges to Ownership In some cases, third party users may challenge a registered user's claim of ownership to a content object and their Deemed Original status. In some embodiments, any challenger must have registered the related content and provided identity verification. The system does not need to make any judgment in such a situation, but may capture and publish information from each party along with other relevant information (such as time of first appearance).

A challenger may be required show good faith by agreeing to specified dispute resolution rules. These rules could include legal fee shifting (loser pays attorneys' fees), liquidated damages (e.g., a fixed minimum amount), and/or arbitration (e.g., rapid, non-appealable resolution of the dispute). In the event that the challenged user declines any reciprocal agreement, "Deemed Original" status may be revoked. In some embodiments, whether and how the challenging user can thereafter acquire "Deemed Original" status is configurable.

In some embodiments, the "Deemed Original" process uses historical search results from an archive, such as the Internet Archive. The Internet Archive could be queried and results cached at the time of registered content capture. Where available, challenge participants can be encouraged to provide Archive references in their dispute statements.

In some embodiments, a separate terms-of-service disclosure and acceptance process is required to activate the publication of Deemed Original status. For example, the disclosure may highlight the dispute resolution terms, and any uncertainties associated with issues like enforceability and conflict of laws.

In some embodiments, the terms of service provide that multiple challenges to a user's Deemed Original status may result in account termination. Such conditions may trigger human review by a staff member.

Although the foregoing embodiments have been described in some detail for purposes of clarity of understanding, the invention is not limited to the details provided. There are many alternative ways of implementing the invention. The disclosed embodiments are illustrative and not restrictive.

To review, one embodiment of the technology may comprise a system for evaluating content, including a processor configured to: (a) determine a host policy associated with one or more host policy rules (where the host policy specifies one or more conditions under which the content may be hosted); (b) automatically assess compliance with the one or more host policy rules based at least in part on a context associated with the use of the content; and (c) combining the compliance assessments to make a compliance evaluation. Such a system includes a memory coupled with the processor, where the memory provides the processor with instructions.

Another embodiment of the technology may comprise a computer program product for evaluating content. The computer program product is embodied in a computer readable medium and includes computer instructions for (a) determining a host policy associated with one or more host policy rules (where the host policy specifies one or more conditions under which the content may be hosted); (b) automatically assessing compliance with the one or more host policy rules based at least in part on a context associated with the use of the content; and (c) combining the compliance assessments to make a compliance evaluation.

Yet another embodiment of the technology may comprise a system for making a determination of originality of content, including a processor configured to: (a) analyze at least one originality factor related to the content, wherein the originality factor is independent of a time when the content is detected; (b) based on the analysis of the at least one originality factor, automatically make the determination; and (c) output the determination. Such a system includes a memory coupled with the processor, where the memory provides the processor with instructions.

Still another embodiment of the technology may comprise a computer program product for making a determination of originality of content. The computer program product is embodied in a computer readable medium and includes computer instructions for: analyzing at least one originality factor related to the content, wherein the originality factor is independent of a time when the content is detected; (b) based on the analysis of the at least one originality factor, automatically making the determination; and (c) outputting the determination.

What is claimed is:

1. A video data processing method for analyzing an item of video content, uploaded to a video sharing service by a member of the public, to determine whether part of any item of known video content, from a database of plural items of known video content, is included in the uploaded video content, the method comprising:
    computing fingerprint data from the uploaded video content, including, for each of plural different parts of the uploaded video content, computing a different fingerprint datum;
    checking the computed fingerprint data against a database comprising fingerprint data for plural different known content objects, the fingerprint data for each of said known content objects comprising plural fingerprint data, respectively associated with different parts thereof, to thereby identify one or more of the different parts of a first known content that match one or more of the different parts of the uploaded video content;

determining an extent of copying, of the first known content within the uploaded video content, as a percentage of the first known content extent;

comparing said determined percentage against a percentage threshold value that indicates a permitted percentage of copying of the first known content, said threshold value being less than 100%; and establishing how the video-sharing service is to treat the uploaded video content, in accordance with a result of said comparing;

wherein the method earlier included presenting an interface to a proprietor of the first known content, through which the proprietor specified said threshold value, for judging a permitted extent of copying of the first known content; and wherein the method thereby enables different proprietors to specify different percentage threshold values by which treatment of their known content objects, within uploaded videos, is to be established.

2. The method of claim 1 in which said interface receives said threshold from the proprietor as a percentage value.

3. The method of claim 1 in which said interface is a graphical user interface, including a drop-down menu for specifying said threshold.

4. The method of claim 1 that further includes:

determining that an extent of copying, of the first known content object by said uploaded item of video content, is less than the threshold value, and treating the uploaded item of video content in a first manner as a consequence;

receiving a second item of video content, uploaded to the service by a member of the public;

computing fingerprint data from the second item of uploaded video content;

checking the computed fingerprint data against a database of known content object fingerprints, to identify said first known content copied within the uploaded video content;

determining an extent of copying, of the first known content within the uploaded second item of video content, as a percentage;

comparing said determined percentage against said threshold value; and treating the uploaded second item of video content in a second manner as a consequence, the second manner being different than said first manner.

5. The method of claim 4 in which said act of computing fingerprint data from the second item of uploaded video content comprises computing wavelet-based fingerprint data.

6. The method of claim 1 in which said act of computing fingerprint data comprises computing wavelet-based fingerprint data.

7. A non-transitory computer readable medium containing software instructions for configuring a hardware system to perform steps including:

receiving an item of video content, uploaded to the system by a member of the public;

computing fingerprint data from the uploaded video content, including, for each of plural different parts of the uploaded video content, computing a different fingerprint datum;

checking the computed fingerprint data against a database comprising fingerprint data for plural different known content objects, the fingerprint data for each of said known content objects comprising plural fingerprint data, respectively associated with different parts thereof, to thereby identify one or more of the different parts of a first known content that match one or more of the different parts of the uploaded video content;

determining an extent of copying, of the first known content within the uploaded video content, as a percentage of the first known content extent;

comparing said determined percentage against a percentage threshold value that indicates a permitted percentage of copying of the first known content, said threshold value being less than 100%; and establishing how the video-sharing service is to treat the uploaded video content, in accordance with a result of said comparing;

wherein the software instructions further include instructions for receiving said threshold value from a proprietor of the first known content; and wherein the software instructions thereby enable different proprietors to specify different percentage threshold values by which treatment of their known content objects, within uploaded videos, is to be established.

8. The computer readable medium of claim 7 in which the steps of computing fingerprint data comprises computing wavelet-based fingerprint data.

9. A video data processing method for analyzing an item of video content, uploaded to a video sharing service by a member of the public, to determine whether part of any item of known video content, from a database of plural items of known video content, is included in the uploaded video content, the method comprising the acts:

computing fingerprint data from the uploaded video content, including, for each of plural different parts of the uploaded video content, computing a different fingerprint datum;

checking the computed fingerprint data against a database comprising fingerprint data for plural different known content objects, the fingerprint data for each of said known content objects comprising plural fingerprint data, respectively associated with different parts thereof, to thereby identify one or more of the different parts of a first known content that match one or more of the different parts of the uploaded video content;

determining an extent of copying, of the first known content within the uploaded video content, as a percentage;

comparing said determined percentage against a threshold value; and establishing how the video-sharing service is to treat the uploaded video content, in accordance with a result of said comparing;

wherein the method earlier included presenting an interface to a proprietor of the first known content, enabling the proprietor to specify said threshold value for judging a permitted extent of copying of the first known content, and receiving a value of 20% as said threshold value specified by said proprietor through said interface; and wherein the method thereby enables different proprietors to specify different percentage threshold values by which treatment of their known content objects, within uploaded videos, is to be established.

10. A content monitoring system including a processor and a memory, the memory comprising instructions configuring the system to perform acts including:

presenting an interface to a proprietor of first known content, enabling the proprietor to specify a threshold value for judging a permitted extent of copying of first the known content;

computing identifying feature data for an item of video content uploaded to a video sharing service by a member of the public, including, for each of plural different parts of the uploaded video content, computing different identifying feature data;

checking the computed identifying feature data against a database comprising identifying feature data for plural different known content objects, the identifying feature data for each of said known content objects comprising plural data, respectively associated with different parts thereof, to thereby identify one or more of the different parts of said first known content that match one or more of the different parts of the uploaded video content;

determining an extent of copying, of the first known content within the uploaded video content, as a percentage of the first known content extent;

comparing said determined percentage against a percentage threshold value that indicates a permitted percentage of copying of the first known content, said threshold value being less than 100%; and establishing how the video-sharing service is to treat the uploaded video content, in accordance with a result of said comparing;

wherein the method thereby enables different proprietors to specify different percentage threshold values by which treatment of their known content objects, within uploaded videos, is to be established.

11. The system of claim 10 in which the act of computing fingerprint data comprises computing wavelet-based fingerprint data.

12. The system of claim 10 in which said instructions configure the system to receive said threshold from the proprietor as a specified percentage value.

13. The system of claim 10 in which said interface is a graphical user interface, including a drop-down menu for specifying said threshold.

14. A content monitoring system including a processor and a memory, the memory comprising instructions configuring the system to perform:

presenting an interface to a proprietor of first known content, enabling the proprietor to specify a threshold value for judging a permitted extent of copying of first the known content;

computing identifying feature data for an item of video content uploaded to a video sharing service by a member of the public, including, for each of plural different parts of the uploaded video content, computing different identifying feature data;

checking the computed identifying feature data against a database comprising identifying feature data for plural different known content objects, the identifying feature data for each of said known content objects comprising plural data, respectively associated with different parts thereof, to thereby identify one or more of the different parts of said first known content that match one or more of the different parts of the uploaded video content;

determining an extent of copying, of the first known content within the uploaded video content, as a percentage;

comparing said determined percentage against a threshold value; and establishing how the video-sharing service is to treat the uploaded video content, in accordance with a result of said comparing;

wherein the method thereby enables different proprietors to specify different percentage threshold values by which treatment of their known content objects, within uploaded videos, is to be established; and wherein said threshold value is 20%.

15. A content monitoring method comprising:

a specifying step for enabling a first proprietor to specify a first quantity threshold value for judging a permitted extent of copying of a first known video item, as a percentage, and enabling a second proprietor to specify a second quantity threshold value for judging a permitted extent of copying of a second known video item, as a percentage, wherein said step enables the specified second threshold value to be different than the specified first threshold value;

computing identifying feature data for an item of video content uploaded to a video sharing service by a member of the public, including, for each of plural different parts of the uploaded item of video content, computing corresponding identifying feature data;

checking the identifying feature data computed for the item of uploaded video content against a database comprising reference feature data for plural different known content items, including said first and second content known items, the reference feature data for each of said first and second known content items comprising plural data, respectively corresponding to different parts thereof, and thereby identifying one or more of the different parts of the first known content item that match one or more of the different parts of the uploaded video content item;

determining an extent of copying, of the first known content item within the uploaded video content item, as a percentage of the first known content item;

comparing said determined percentage against the first quantity threshold value specified by the first proprietor, said first quantity threshold value being less than 100%; and establishing how the video-sharing service is to treat the uploaded video content item, in accordance with a result of said comparing;

wherein the method thereby different proprietors to specify different percentage threshold values by which treatment of their known content items, within uploaded content items, is to be established.

16. The method of claim 15 that further includes the steps: computing identifying feature data for a second item of video content uploaded to the video sharing service by a member of the public, including, for each of plural different parts of the second item of uploaded video content, computing corresponding identifying feature data;

checking said identifying feature data computed for the second item of uploaded video content against said database, and thereby identifying one or more of the different parts of the second known content item that match one or more of the different parts of the second uploaded video content item;

determining an extent of copying, of the second known content item within the second uploaded video content item, as a percentage of the second known content item;

comparing said determined percentage against the second quantity threshold value specified by the second proprietor; and establishing how the video-sharing service is to treat the second uploaded video content item, in accordance with a result of said comparing.

* * * * *